(12) United States Patent
Sterling

(10) Patent No.: US 6,466,975 B1
(45) Date of Patent: Oct. 15, 2002

(54) SYSTEMS AND METHODS FOR VIRTUAL POPULATION MUTUAL RELATIONSHIP MANAGEMENT USING ELECTRONIC COMPUTER DRIVEN NETWORKS

(75) Inventor: Deborah Sterling, Ottawa (CA)

(73) Assignee: Digital Connexxions Corp., Oakville (CA)

(*) Notice: Subject to any disclaimer, the term of this patent is extended or adjusted under 35 U.S.C. 154(b) by 0 days.

(21) Appl. No.: 09/477,168

(22) Filed: Jan. 4, 2000

Related U.S. Application Data

(60) Provisional application No. 60/150,380, filed on Aug. 23, 1999.

(51) Int. Cl.[7] ............................................... G06F 13/00
(52) U.S. Cl. ............................. 709/223; 709/1; 709/219
(58) Field of Search ........................... 709/1, 203, 219, 709/223, 224, 225, 227, 313, 328, 329

(56) References Cited

U.S. PATENT DOCUMENTS

| | | | | |
|---|---|---|---|---|
| 5,495,576 A | * | 2/1996 | Ritchey | 395/125 |
| 5,675,746 A | * | 10/1997 | Marshall | 705/35 |
| 5,754,740 A | * | 5/1998 | Fukuoka et al. | 706/58 |
| 5,809,492 A | * | 9/1998 | Murray et al. | 706/45 |
| 5,835,087 A | * | 11/1998 | Herz et al. | 345/327 |
| 5,867,799 A | * | 2/1999 | Lang et al. | 707/1 |
| 5,874,955 A | * | 2/1999 | Rogowitz et al. | 345/339 |
| 6,003,020 A | * | 12/1999 | Hazlehurst et al. | 706/11 |
| 6,057,841 A | * | 5/2000 | Thurlow et al. | 345/347 |
| 6,073,142 A | * | 6/2000 | Geiger et al. | 707/500 |
| 6,288,717 B1 | * | 9/2001 | Dunkle | 345/334 |

* cited by examiner

Primary Examiner—Viet D. Vu
(74) Attorney, Agent, or Firm—Baker Botts L.L.P.

(57) ABSTRACT

A method and system for creating and managing Virtual Population mutual relationships is disclosed. The method uses a Rich Semantic Model component, expert system components, and various interface components and other components to dynamically alter the visitation experience as received by the Visitor at a computer and to allow the Visitor control over their Virtual Representative that controls this personal experience.

6 Claims, 14 Drawing Sheets

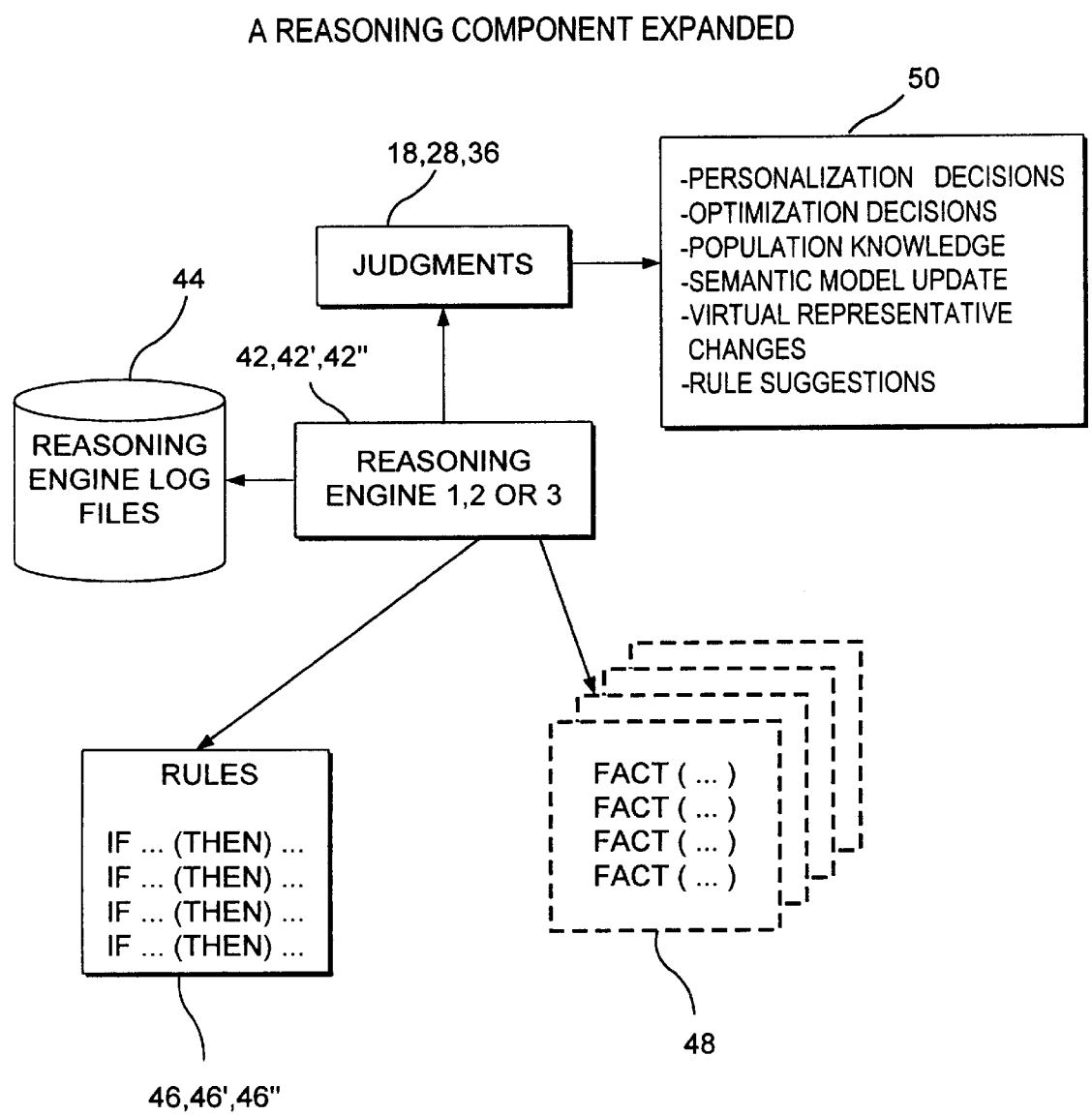
F I G. 4

ENTERPRISE EXPERT S TOOLSET - CONTENT LIBRARY MANAGEMENT TOOL
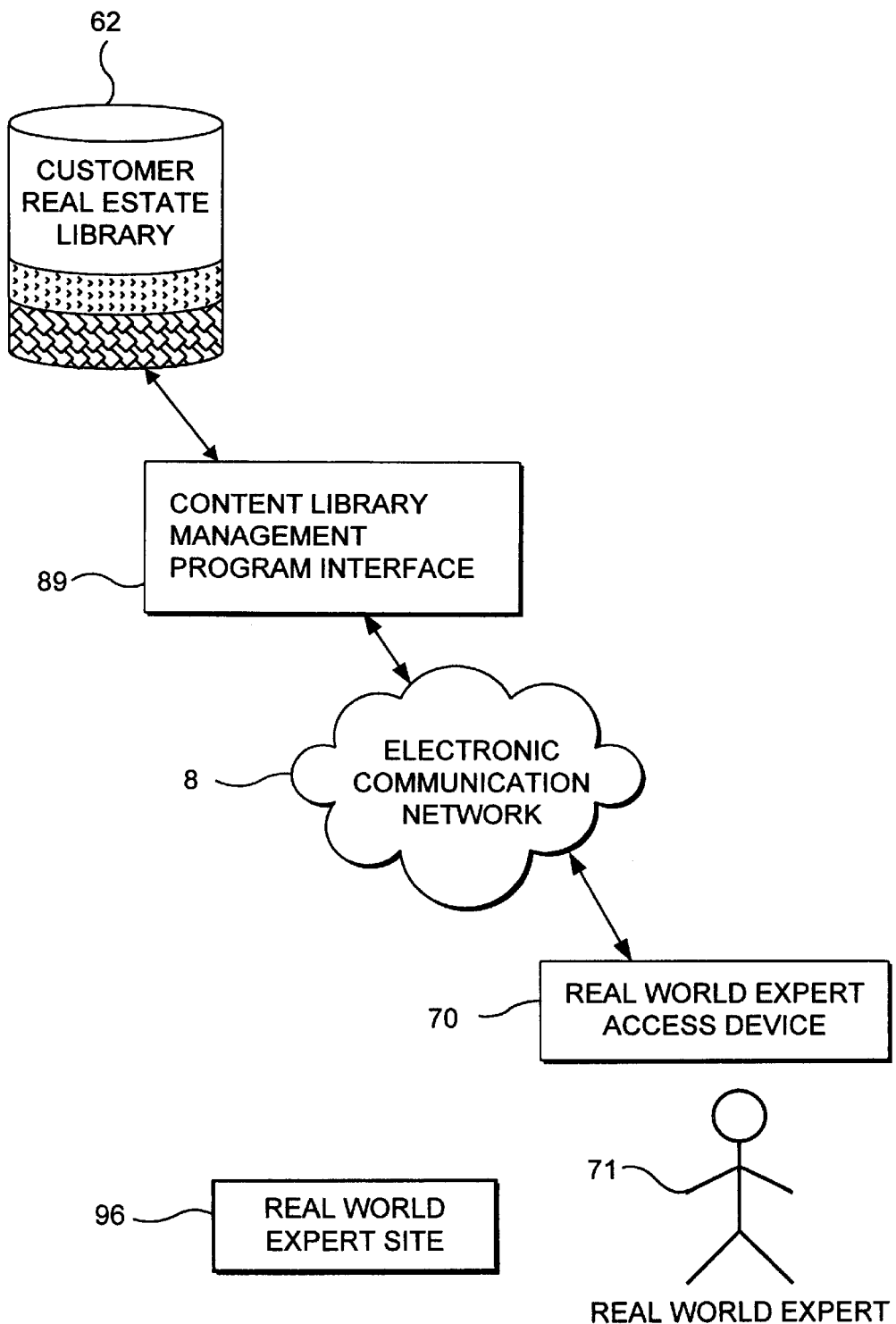
F I G. 12

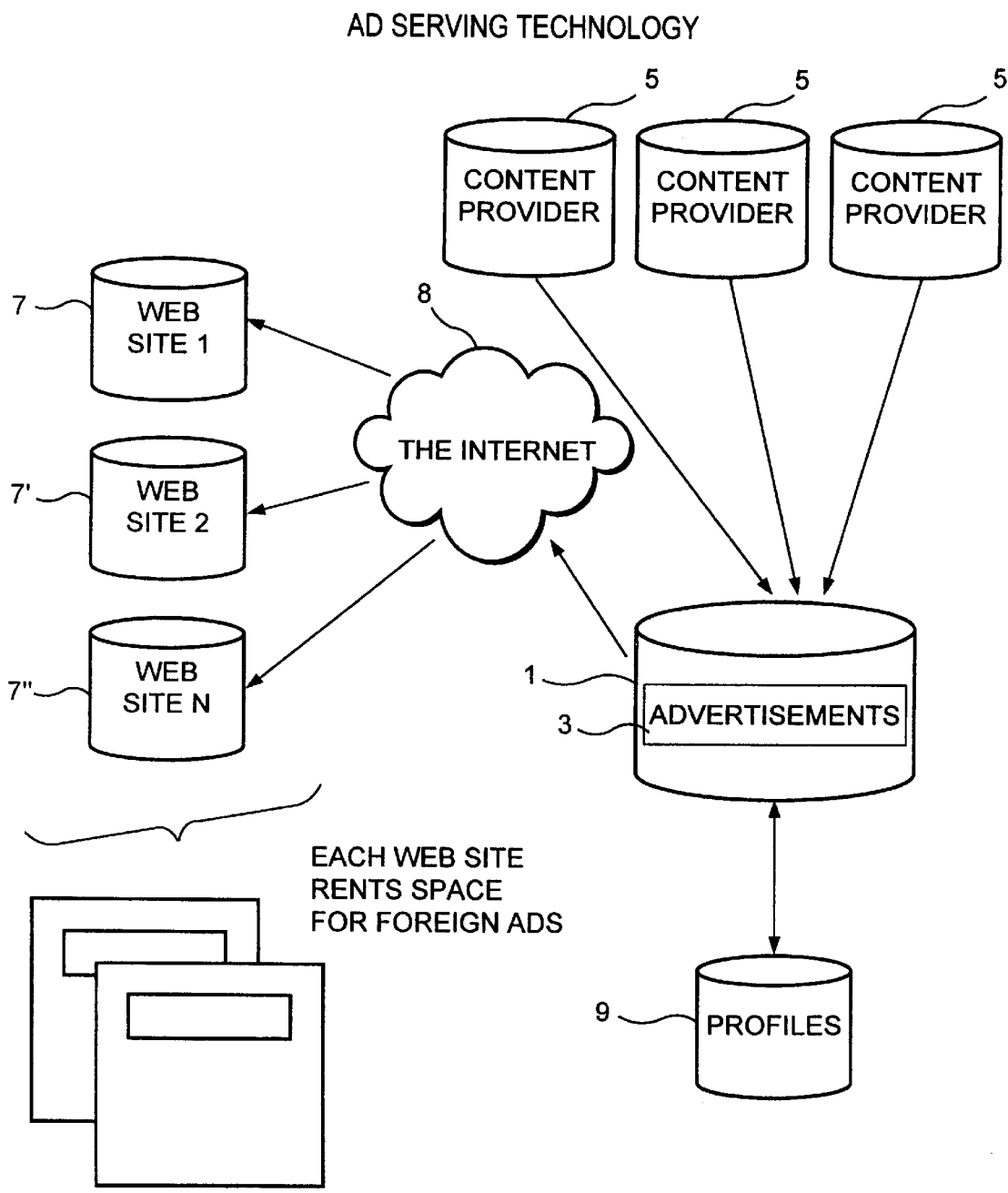
F I G. 14 ns and methods for virtual population mutual relationship management using electronic computer driven networks

CROSS-REFERENCE TO RELATED PRIOR APPLICATIONS

This application claims priority to U.S. Provisional Application No. 60/150,380, filed Aug. 23, 1999, the subject matter of which is incorporated by reference herein.

FIELD OF THE INVENTION

The present invention relates to systems and methods for dynamically exchanging information electronically using an Electronic Communication Network. More particularly, the present invention relates to creating and managing personalized experiences for Visitors to a network Enterprise Site to create and maintain a dynamic virtual mutual relationship between an electronic expert system emulating a real world Enterprise Expert and the Visitor. Most particularly, the present invention relates to such systems applied to electronic commerce and specifically to electronic marketing applications.

BACKGROUND OF RELATED TECHNOLOGY

Traditional mediums of marketing and advertising have all been inherently broadcast. A message delivered on radio, television, billboards, magazines and the like is delivered to a broad base of individuals. The information received in this manner is identical to all individuals. For example, every person who opens a particular issue of a magazine or views a television advertisement sees exactly the same information. Using this traditional broadcast media, the marketer has only been able to deliver personalized messages to a broad base. For example, the marketer targets readers of a science magazine based on the facts that the readership is largely university educated with an interest in science and has a particular range of income.

With the advent of computer-driven electronic spaces, such as computer networks, and in particular the Internet, the opportunity now exists for delivering visitor information in a completely "soft" medium, i.e., where all components of information are delivered under software control. This is in contrast to delivering information in a "hard" format, such as through traditional print advertisements. A medium such as the Internet is inherently non-broadcast. For the first time in history, an inherently non-broadcast medium is available to fulfill the marketer's dream of true "one-to-one" personalization. Although banner spaces used on the Internet for advertising and the like are essentially broadcast in nature, electronic spaces offer, by way of software control, the possibility of targeting individuals uniquely, thereby permitting the delivery of personalized information to the individual.

Marketing on the Internet has thus far consisted primarily of providing advertisements to web site visitors in an essentially broadcast manner. As illustrated in FIG. 14, typical electronic advertising systems include an advertisement server 1 which contains advertisements 3 provided by content providers 5. Individuals visiting web sites 7, 7', and 7" are shown advertisements 3 which are transmitted from the advertisement server 1 to the web sites 7, 7', and 7" over the Internet 8. New advertisements 3 are typically selected at established intervals to replace those being shown to the visitor. While these advertisements 3 are often shown randomly to the visitor, they may be selected based on information which is known about the visitor, such as when facts about the visitor have been stored in a profile database 9.

Typically, when a visitor selects an advertisement 3, such as by clicking on an advertisement banner using a mouse, the visitor is sent to the advertiser's web site. Generally, the web site owner is compensated for displaying the advertisements 3 and is additionally compensated each time a visitor clicks on an advertisement 3. To the extent that advertisements 3 on an owner's web site 7, 7', or 7" are not inconsistent with the interests of the owner, the owner is not generally concerned with the content of the advertisements 3. This is similar to traditional broadcast advertising in magazines.

As noted, some companies offer advertisement-server technology which utilize systems involving profiles in order to personalize electronic marketing. Profiles, which can be edited and are often updated by tracking the behavior of individuals on the World Wide Web, can be used to determine the particular advertisements, including their background, coloration, etc. that an individual will experience when visiting a web site. As an individual navigates a web site, provides information, and makes purchases, her profile is updated accordingly, thereby allowing for a more customized visitation experience. However, such systems are very limited in their ability to provide the visitor with a unique visitation experience as they are limited to comparing and matching information contained in various databases (e.g., a profile database and an advertisement database). These systems are also limited to advertising. Their purpose is not to manage the relationship or personalize the experience directly with the Ad hosting sites 7, 7', and 7".

For instance, U.S. Pat. No. 5,933,811 (Angles et al.) describes a system for delivering customized electronic advertisements in an interactive communication system. The customized advertisements are selected based on consumer profiles and are then integrated at different web sites. The consumer provides data which is used to establish her profile. When the consumer selects content on a web site, an advertising request is sent to an advertisement provider computer which then generates a custom advertisement based on the consumer's profile.

Customized advertising is also described in U.S. Pat. No. 5,948,061, assigned to DoubleClick$^{SM}$, Inc. This patent essentially uses data from a user profile to select an appropriate advertisement from a data bank of advertisements most appropriate to display to the user. This system requires an advertising server, a content provider, a user mode, an affiliate web site, and an advertising web site. When a user visits a web page which is affiliated with the advertising server, the affiliated page includes an embedded reference to an object provided by the advertising server which causes the advertising server to provide the advertising image which will appear on the web page displayed by the user's browser. The server uses information about the user which is passed on by the browser to select an appropriate advertisement for the particular user. Data is compiled about the user, such as the user's name, Internet Protocol address, domain type, time zone, location, particular advertisements seen, and the number of times each are seen. This data is then compared with various ads to select an appropriate match.

Further, U.S. Pat. No. 5,717,923, assigned to Intel® Corporation, describes another method of Ad serving. This method includes customizing electronic information, such as advertisements, to the preferences of an individual user. This method compares user preference data in a user profile database to a unit of electronic information to generate a customized unit of electronic advertising information. The user profile is updated using a client activity monitor which allows for further customization of electronic information.

The aforementioned advertising systems do not allow for particularly effective personalized marketing. They are very limited in their ability to present the user with a customized web site visitation experience, relying primarily on correlating particular advertisements with certain information known about the visitor. Customization of the visitation experience is limited to utilizing information contained in a profile database, which may be updated as the visitor navigates the web site. However, advertising is but a small part, and even not the most important part, of a visitation experience. As an example, what is more important when visiting a web store is the web store itself, not the advertising therein. The goal of one-to-one marketing on the web is not to focus on the advertisements of a web site, but on the visitor experience at the site itself.

To date, efforts to create computer-driven network systems to manage personalized relationships in electronic space have suffered from the failure to apply the right technology to the problem. Such systems are unable to provide personalized visitation experiences to web site visitors which mirror the experiences those visitors would have in the real world. Human interaction as it occurs naturally between individuals is extraordinarily complex and involves aspects of human intelligence such as reasoning, memory, behavior, and perception. Indeed, successful and mutually rewarding relationships often involve exploiting these aspects. Translating features of a successful mutual relationship to a virtual place, such as over a computer network, to create and foster virtual mutual relationships is a very complex task. The technology that allows this problem to be realistically tackled is artificial intelligence (AI) technology.

Artificial intelligence systems have been employed in attempting to provide personalized marketing to visitors of web sites. However, these attempts have been largely inadequate. For example, neural network systems, a form of artificial intelligence, have been used for personalized electronic marketing. Such systems attempt to emulate a thinking brain and must be trained in order to process the information with which they are presented. While they are artificial intelligence systems, they are not expert or rules-based systems, i.e., they do not use inferencing engines to apply a set of rules to sets of facts or represented semantically modeled information to obtain reasoned results. For instance, U.S. Pat. Nos. 5,774,868 and 5,504,675 (both to Cragun et al.), both assigned to International Business Machines®, describe sales promotion systems which utilize neural networks. In the '868 patent, a trained neural network is used to recommend product purchases to consumers by grouping products into categories and then analyzing which products a consumer has purchased from that category. The '675 patent describes a system wherein data is collected relating to the success of various sales programs. The collected data is applied to a trained neural network so that the neural network can select the most appropriate sales program to run.

Additionally, there are companies which offer systems which tailor the visitation experiences of customers by applying business rules to customer profiles. While these companies may claim to offer systems which use reasoning capabilities similar to that of a salesperson in order to better understand a visitor and provide a unique visitation experience, these systems lack sufficient artificial intelligence components to effectively establish virtual mutual relationships that are based on aspects of human interaction. These systems do not use expert systems technology and lack the sophistication of this technology.

Companies such as Net Perceptions® (www.netperceptions.com) and Athenium™ offer electronic marketing technology which uses a form of an artificial intelligence technique known as collaborative filtering. This is a statistical inferencing technique that attempts to infer the preferences of individuals by associating them with like individuals, for example. U.S. Pat. No. 5,918,014 (Robinson) describes an automated collaborative filtering system for use in World Wide Web advertising. In this system, statistical inferencing is employed to group of persons displaying similar likes and dislikes into communities. If the members of a subject's community tend to click on a particular web advertisement, then it is inferred that it is likely that the subject will tend to click on that advertisement. Using this information, selected advertisements are presented to the individual. One of the features of this system is determining the communities that individuals belong to based on statistical analysis.

Another use of statistical inferencing techniques is found in the back-end statistical inferencing used in data mining. Companies offering data mining systems gather and analyze data on individuals in order to group individuals according to similarities. Once individuals have been grouped, inferences are drawn regarding the products, services, etc. that will appeal to an individual based on choices made by other individuals in the same group.

While collaborative filtering, data mining, and the use of neural networks provide useful and sophisticated tools for segmentation, they are limited to but a small aspect of the problems associated with one-to-one marketing in a non-broadcast media such as the World Wide Web. As we have seen, advertisement serving technology is limited to the "foreign context" aspect of a visitation experience and is very much like traditional broadcast advertising, simply applied on-line. What is desired is the application of technology that will achieve the effect of an on-line cyber-salesperson in all aspects of its complexity. The "brain emulation" techniques offered by neural networks and collaborative filtering are technologies that are too immature to emulate the type of sophisticated human behavior required in such a salesperson.

Another weakness of these technologies is that the relationship with the user is completely one-sided. The user is watched, data is collected, and users are compared and then broadcast to, etc. However, there is absolutely no involvement from the user.

Thus, until now, personalized marketing using the Internet has not been particularly successful. The system approaches taken have been either too limited in their outlook, have used inappropriate underlying technology, i.e., no AI, or have applied an ineffective or inefficient AI technology.

Accordingly, there is a need for a system which can be used on a computer-driven network which provides for the creation and maintenance of personalized experiences and which establishes and augments virtual mutual relationships. There is further a need for such a system which is intelligent, yet is user friendly and relatively inexpensive. Still further, there is a need for a system which can approach the level of sophistication of a cyber-salesperson through the correct application of available artificial intelligence technology. The present invention is directed towards meeting these and other needs.

SUMMARY OF THE INVENTION

The present invention includes the application of rules-based and expert systems artificial intelligence technology to computer-driven network systems which permit the User, i.e., a Visitor, to experience a personalized Virtual Visit to a Virtual Place. In contrast to neural networks and collaborative filtering systems, expert systems technology focuses on emulating captured expert knowledge and reasoning rather than emulating the brain. The expert systems of the present invention emulate Real World Experts. The personalized experience of such a visit permits the creation, management and fostering of a virtual mutual relationship between the Visitor and an electronic Enterprise Expert whereby the satisfaction of needs or interests can be fulfilled, much in the same manner ordinary human interaction occurs. In a typical visit, various components of the system interact to: (i) target the visitor; (ii) dynamically alter the content displayed to the visitor; and (iii) dynamically optimize the overall experience of the visitation, among other things.

A primary goal of such a personalized experience over an Electronic Communication Network is to establish a mutual relationship between an Enterprise Expert, for example a virtual salesperson, a virtual librarian, a virtual physician and the like, and the Virtual Visitor, i.e. the Virtual Representative of the actual User. For example, the Virtual Visitor might be the Virtual Representative of an actual User who is using a personal computer connected to the Internet to access an electronic site which deploys the methods and systems of the present invention. By establishing a virtual mutual relationship, meaningful interaction which is intended to emulate that of one-on-one human interaction transpires. The ability to develop the loyalty, trust, and satisfaction of the customer, which in the above example is the personal computer User, is a skill which most good sales and marketing people possess. Balanced against obtaining customer satisfaction and promoting goodwill is accomplishing the goals of the Enterprise, which in the context of e-commerce or e-marketing is the selling of goods or services. The present invention seeks to develop and maintain a mutual relationship based on these relationship attributes through the personalization of the visitation experience as well as by allowing a User control over her Virtual Representative.

In one aspect of the present invention is provided a method for dynamically creating and managing mutual relationships between a virtual visitor and a virtual enterprise expert on an electronic network which includes the steps of: (i) Providing a virtual population, the semantic model of which is rendered specific to one or more real world populations, the virtual population comprising instances of said model; (ii) Providing expert system software which effects a virtual enterprise expert, where the software is tailored to a particular virtual population; and (iii) Applying the expert system software to an instance of the semantic model to create a unique virtual visitation experience. This method may employ one or more computer systems which include one or more user site computers, one or more visit site computers, and one or more population site computers.

This method may also include the step of providing a billing system which is capable of billing based on rule success and/or successful use of real world visitor identification, the real world visitor identification including identification of population instances, identification with specific facts, identification with custom facts, and identification with some number of facts.

In another aspect of the present invention is provided a method for dynamically creating and managing mutual relationships between a virtual visitor and a virtual enterprise expert on an electronic network which includes the steps of: (i) Providing a virtual population, the semantic model of which is rendered specific to one or more real world populations, the virtual population comprising instances of the model; (ii) Providing software accessible to a real world enterprise expert, the software permitting the real world expert to create one or more expert rules which can be applied to instances of the semantic model; (iii) Providing expert system software which effects a virtual enterprise expert, the software tailored to a particular virtual population; and (iv) Applying the expert system software to an instance of the semantic model to create a unique virtual visitation experience in accordance with the real world expert rules, the interests and/or desires of the visitor, and the expert knowledge of the expert system software. This method may further include web-based versions of a rule editor, a report generator, and/or a content management system.

In a further aspect of the present invention is provided a system for dynamically creating and managing mutual relationships between a virtual visitor and a virtual enterprise expert on an electronic network which includes: (i) A virtual population, the semantic model of which is rendered specific to one or more real world populations, the virtual population including instances of the model; (ii) Software accessible to a real world enterprise expert, the software permitting the real world expert to create one or more expert rules which can be applied to instances of the semantic model; and (iii) Expert system software which effects a virtual enterprise expert, the software tailored to a particular virtual population, wherein the application of the expert system software to an instance of the semantic model creates a unique virtual visitation experience in accordance with the real world rules, the interests and/or desires of the visitor, and the expert knowledge of the expert system software.

In a further aspect of the present invention is provided a system for conducting real-time dynamic marketing on the Internet which includes: (i) A web site which contains information which can be dynamically altered and made available to a web site visitor; (ii) Expert system software which effects a virtual enterprise expert, the software tailored to a particular virtual population; and (iii) A stored, retrievable, and updateable virtual population accessible through a machine-readable database, the semantic model of which is rendered specific to one or more real world populations, the virtual population comprising instances of said model.

In a still further aspect of the present invention is provided a system for creating and maintaining a virtual mutual relationship, the system being accessed by a user through a network by one or more networked computers which includes: (i) A database comprising a richly semantically modeled virtual population; (ii) One or more expert systems in communication with the database and the software associated with a network site, the expert systems(s) being capable of performing at least one or more of the following tasks: (a) applying expert rules to instances of the semantically modeled population to produce a reasoned result; (b) applying expert system knowledge to instances of the semantically modeled population to produce a reasoned result; (c) observing and understanding its own activity; (d) learning new information as such information is generated; (e) creating new expert rules automatically; and (f) reporting on (a)–(e) above.

For purposes of this invention the following definitions apply:

Application Program Interface (API)

This is a standard term used to describe a programmer access mechanism to supplied software.

Electronic Communication Network

Any electronic environment that allows communications between computing devices, and/or computing access devices of any sort. Examples are an Internet Protocol network, a cable network, a kiosk network, a telephone network, a satellite network, or the World Wide Web. Computing devices and computing access devices include personal computers, touch sensitive screens, web TV, touch-tone telephones, personal digital systems, Virtual Reality equipment such as gloves, head gear, clothing, sensory devices and the like, dumb terminals, Java virtual machines, or any other electronic communication device. Networks include, but are not limited to, Internets, Intranets, Extranets, Local Area Networks, Wide Area Networks, and combinations thereof.

Desirable, the Electronic Communication Network used in the present invention may be a private IP network, a public IP network, the World Wide Web, or a combination of public and private IP networks.

Enabled Site

An Enterprise Site which has deployed the technology as described herein on a computing device in an electronic network. The computing device can be distributed and made available to multiple Users. The system of the current invention allows for maximum flexibility in terms of networked deployment of its components.

Enterprise and Customer

The organizational entity which uses its Site to reach Visitors for the purpose of furthering its goals. The Enterprise owner is the Customer or User of most aspects of the present invention. For example, the Enterprise mentioned in numerous examples herein are electronic library, e-commerce store, and virtual town X.

Enterprise Expert

A Virtual Expert which has expertise in the goals and/or business of any particular Enterprise. For example, a cyber-librarian is an expert about books, libraries, library searches, etc. As another example, the enterprise expert may be an e-commerce expert. For instance, a cyber-salesperson is an expert about selling the goods and services of a business Enterprise or market area. This expert is effected by an expert system using expert system and related AI and other software technologies. The Enterprise Expert may be deployed on a third-party hosted computer.

Population Expert

A Virtual Expert which applies expert knowledge of a population to achieve additional knowledge about the population for future reasoning thereon. Such knowledge is represented and augmented in the Virtual Population. A Virtual Population might be a population of library users, professionals, consumers, travelers, etc. On the other hand, the ultimately rendered Semantic Model would simply be "person" and include views of different facets of a person. For example, one can be both a consumer, a professional, and a traveler.

Real Estate

User interface areas which can vary under software control. These areas are components of the Virtual Place of a particular Enterprise. An example would be the varying areas on web pages representing the sections of an on-line department store. These areas will vary under intelligent software control, responding to the individuality of the virtual consumer entering the store. Another example would be the rooms in a 3-Dimensional Virtual Reality library, the shelves on display there, or versions of them in dark and light wood.

Real World Expert

The real world equivalent of a particular expert system. For example, a salesman is the Real World Expert that corresponds to a cyber-salesperson.

Semantic Model

A model rich in semantics rendered using artificial intelligence (AI) techniques, referred to herein as a "Rich Semantic Model". Such models are used to solve problems typically associated with those requiring human intelligence. Semantic Modeling is a part of the toolset of AI technology. In the present invention, Semantic Models may vary to suit the goals of the Enterprise. For example, income may be less important in the model of a library Visitor than it would be in the model of a consumer. The Semantic Model may, for example, be a model of consumers. Also, the Semantic Model may include facts which reflect whether the real world visitor is a known or anonymous visitor.

The Semantic Model may contain facts such as universal facts, enterprise-specific facts, custom enterprise-specific facts, and facts which are restricted for use by the real world user. Universal facts are facts which are potentially available to all enterprises or customers, e.g., "name", "gender". There is no reason to restrict this type of fact to a particular enterprise or enterprise class (e.g., retail or travel enterprise classes). Enterprise-specific facts are facts which are useful to any particular enterprise but which differ for each enterprise. For example, "number of visits" for each of multiple e-Stores may have a different value. Therefore, such facts are enterprise or customer specific, although all enterprises use it. Custom enterprise-specific facts are facts which are of particular use to a particular customer. For example, "air miles" is a fact which contains air mile rewards, but only a particular airline has "air miles".

Site

The physical location where components of the Electronic Communications Network reside. The place where a Virtual Place, Virtual Population, or Visitor is located. For example, a Virtual Population may exist at a data center at one Site, and a Visitor may be at home using a personal computer attached to the World Wide Web at another. A Virtual Reality holiday cruise ship may reside on the computers at yet another Site.

Storage Medium

Any medium capable of having electronic information stored thereon and retrieved therefrom. Examples include hard disks, tapes, compact discs, and the like.

Virtual Expert or Cyber-Expert

A virtual electronic expert which has been created by the use of AI expert systems technology.

Virtual Place

A Virtual Visitation location which is representative of a place in the real world. Examples include a Virtual Reality game space, the on-line Library of Congress, Jane Smith's home page, or Amazon.com on the World Wide Web. Any web site is a Virtual Place.

Virtual Population

A group of Virtual Representatives who fit the Semantic Model which suits the goals of a particular Enterprise, such as an electronic store, library, etc. For example, consumers, members of a library, members of an association, etc. constitute Virtual Populations. They are desirably stored, retrievable, and updateable through a machine-readable database and are richly semantically modeled. The Virtual Population may be stored, retrievable, and updateable at a site where the Virtual Population resides.

Virtual Reality

The technology of today and the future that attempts to create as complete an experience of computer-rendered spaces as possible, such as allowing 3-Dimensional, sound, and tactile interfaces. The World Wide Web will become more sophisticated as known Virtual Reality technology is deployed on networks of increasing bandwidth. The Web, as it exists for the most part for most people today, is essentially Virtual Reality technology in its infancy.

Virtual Visit

The experience of the real world Visitor visiting a Virtual Place. The set of electronic events that comprise the visit.

Virtual Visitor, Virtual Representative

An instance of the Virtual Population which functions as a Virtual Representative for the Visitor. The Virtual Visitor functions as a Virtual Representative for the real world User at an Enabled Site.

Visitor, User

The real world User of a Visitor Access Device. The real world person represented by a Virtual Representative.

Visitor Access Device

A computer or computing access device.

Visitor Expert

An expert that manages the relationship between the Visitor and the Visitor's Virtual Representative. This expert is an expert on the Virtual Population Semantic Model and interacts on a one-to-one basis with Visitors to effect modifications of the Virtual Representative of the Visitor.

BRIEF DESCRIPTION OF THE DRAWINGS:

FIG. 4 shows a Reasoning Component in more detail. What is shown is an expert system technology implementation with a Reasoning Engine which applies rules to facts to produce judgements or results. The log files shown are rich in information about all expert activity and knowledge. In each case, i.e., for Reasoning Engines 1, 2, or 3, an Inference Engine or Reasoning Engine applies rules to facts to produce a reasoned result. The engine is specialized to effect a Site, population, or Visitor Expert in order to achieve personalization decisions, optimization decisions, and population knowledge, as well as to update the Semantic Model, manage Virtual Representative changes under User control, or suggest new rules.

FIG. 12 shows another part of the Toolset provided with the present invention. A Real World Expert is provided a program interface that allows for the editing of the Customer Real Estate Library of a particular Virtual Place. Real Estate can be added, re-labeled, annotated, viewed, removed, etc. in a simple fashion. Labels for the Real Estate are stored by the system and automatically made available to the Rule Editor.

FIG. 14 is a schematic of the salient features of commercially available Ad Serving technology currently used by others. Web sites control foreign space with Ad Serving technology. Ad Serving on the Internet or World Wide Web is the equivalent of traditional advertising in magazines. On the Internet, space is rented and managed by a third party that manages the foreign ads. Content providers supply advertisements of many types to be managed by a central Ad server. Targeting may make use of User profiles in order to more successfully place the right Ad. This is in sharp contrast to the present invention, in which web sites are managed with online cyber-experts.

DETAILED DESCRIPTION OF THE INVENTION

Figure 1:
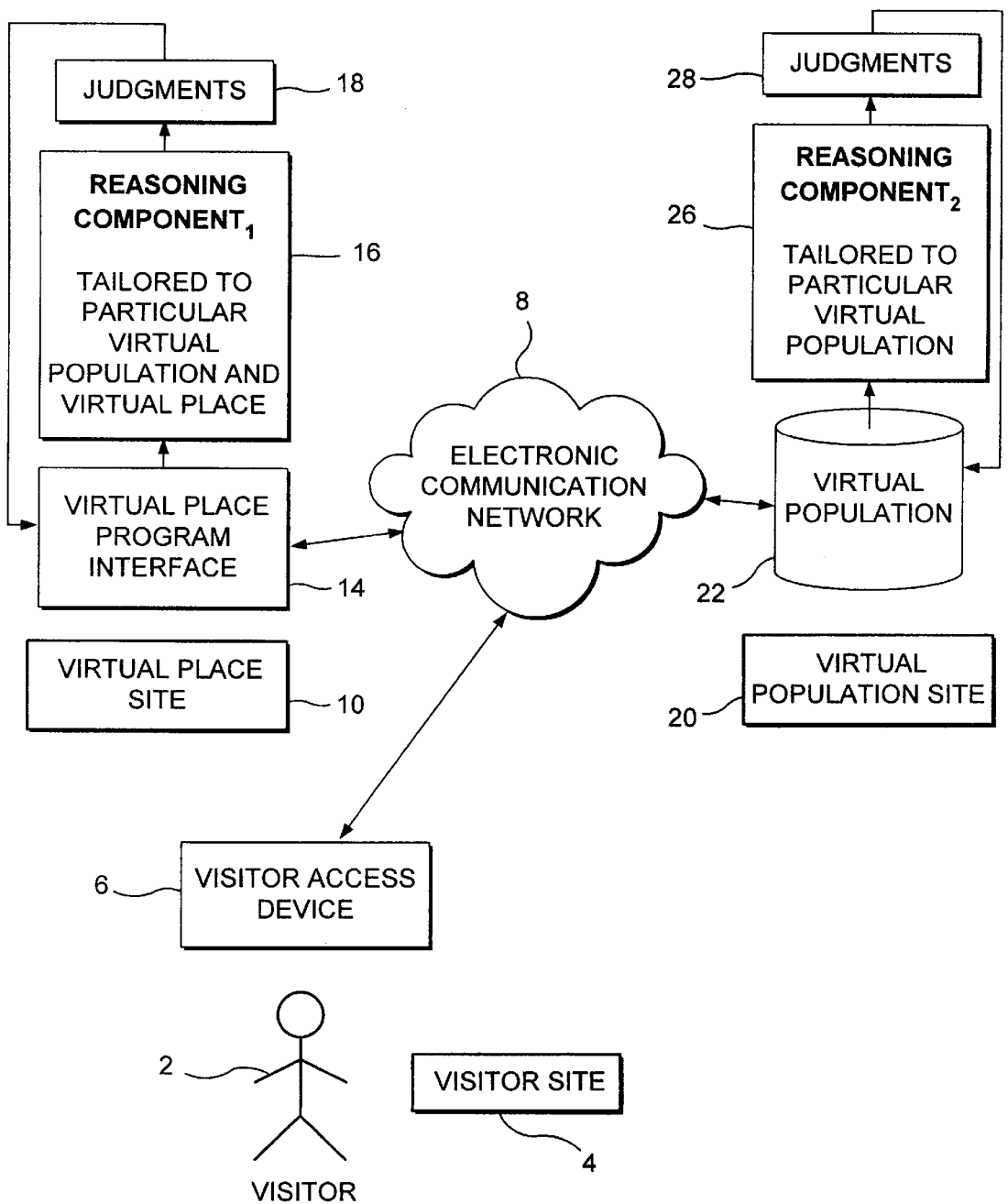
FIG. 1 is a schematic presentation of a system of the present invention showing the Electronic Communications Network, the Virtual Population Site and database, the Virtual Place Site with its program interface, and the Visitor at the Visitor Site. It also shows a Reasoning Component$_1$, which effects the Enterprise Expert, and a Reasoning Component$_2$, which effects a Population Expert. Reasoning Component$_1$ has the expert task of altering the visitation experience of the Visitor. Reasoning Component$_2$ has the expert task of learning new information about the Virtual Population, and thereby enhancing the knowledge about the Virtual Representatives therein. Reasoning Component$_2$ also manages the Virtual Population. The Virtual Population contains the Virtual Representative of the Visitor and supplies this information to the Enterprise Expert at the Virtual Place Site over the Electronic Communications Network.

The following is a brief description of various components of the present invention:

Cold Fusion or Other Plugin

The Plugin provides the interface to the technology that enables the Virtual Place Site. Cold Fusion or other web development tools are supported. A particular API call enables the Reasoning Component to function and return intelligent Real Estate selection results based on the Real Estate location, knowledge of the Virtual Visitor, and expert knowledge. Calls to this API are made in real time as pages load. Another call allows newly learned knowledge about the Virtual Visitor to be added in real time to the Virtual Representative at the Virtual Place Site, and in the Virtual Population at the Virtual Population Site. Newly learned information is available for instant reasoning thereon. The Plugin also provides access to the Virtual Population. Plugin components include a Reasoning Component, the Virtual Visitor Manager, and Customer Data Store access and maintenance.

Customer Code with Real Estate Management Calls and Visitor Learning Calls

API Calls contained in Customer Web Page Code that utilize Real Estate personalization software. In one call, the Real Estate Management Call, the Real Estate to be shown is chosen from the Customer Real Estate Library. In another API call, the Visitor Learning Call, newly learned information about the Visitor is added to the Virtual Representative currently visiting and to the Virtual Representative at the Virtual Population Site.

Customer Data Store

A local data store mechanism used internally by the Plugin that facilitates the storage and retrieval of all Customer Site information used by the Plugin or Enterprise Expert's Toolset. The set of facts comprising currently visiting Virtual Representatives, the Rule Base, Customer Real Estate Library, and the Reasoning Component log files are among that which is stored in the Customer Data Store.

Customer Real Estate Library

The Customer Real Estate Library contains the various Real Estate that is available to display to the User. It is displayed as a result of the dynamic application of rules to facts. Real Estate can be supplied by the customer (i.e., e-commerce store) or by the technology provider (e.g., ResponseLogic™). From the system's perspective, Real Estate is completely arbitrary. Examples of such Real Estate include store promotions, backgrounds with specific colors, surveys, department store headings, personalized messages, pictures, catalog items, animated displays, and the like. Virtually anything that can appear on a web page can be stored in the Customer Real Estate Library. The Library is simply managed by the Enterprise Expert's Toolset.

Enterprise Expert's Toolset

The Enterprise Expert's Toolset consists of a set of tools that allow for Customer Real Estate Library management, rule editing, and access to reports. These tools can be web-based and, as such, can be used over the Internet or over a company Intranet or Extranet. The tools desirably have a point-and-click interface. For instance, the Rule Editor component has a point-and-click interface for entering rules. This is possible because the Semantic Model for Virtual Visitors is fixed. A Content Library Management Tool provides a mechanism for storing, viewing, updating, annotating, and labeling arbitrary Customer Real Estate. This labeling of content may result in the making of labels which will be available for rule decisions. Additionally, this content management system may manage pointers to the content.

A report generator provides access to a wealth of reports based on a wide variety of information available from the Enterprise Expert that sees every Virtual Visitor and can remember everything it ever showed any such Visitor, including all of the reasoning that went into this, among other things. The report generator is desirably capable of reporting one expert activity, rules used, rule success, rules suggested, and/or learnings. For an e-commerce use of the present invention, the Enterprise Expert's Toolset might be called a Marketer's Toolset.

Fact Base

The Fact Base is a database of facts about currently visiting Virtual Visitors. A User's Virtual Representative has been retrieved from the Virtual Population at the initiation of a Virtual Visit. A set of facts comprise a model of the Virtual Visitor. As seen in FIG. 4, each box 48 represents a set of facts comprising a single Virtual Representative. The set of all these Virtual Visitors correspond to Visitor currently visiting the Site.

Basic facts, preferences and behaviors are stored in a simple format so that the Inference Engine can apply rules to them. Some fact examples are "Fact, Client_Visits, 5, 100%" and "Behavior, Purchases, $350, 100%", and "Preference, Books, Science". The Fact Base is populated in one of two ways. Upon the initiation of the Virtual Visit, the Plugin component provides a mechanism for retrieving the Virtual Representative of the User as a Virtual Place is entered. Also, as the visit proceeds, new facts can be added in real time using the API call provided to the Virtual Place interface programmer.

Reasoning Component

This is the core of the expert system. It includes a Reasoning Engine suited and tailored to its expert task, a Rule Base, a Fact Base which comprises a set of current Virtual Visitors, and a set of Reasoning Engine log files.

The expert system software employed in the present invention desirably comprises the Reasoning Engine and may be provided as a software plugin with an Application Programmer Interface. It may also be provided with an Application Programmer Interface as an extension of a web programming environment. Additionally, Application Programmer Interface call may be included which provides access to a Virtual Enterprise Expert whose judgements decide upon web page real estate to be shown to a Virtual Visitor. Further, multiple Application Programmer Interface calls may be used on multiple web pages to manage web page content and may provide access to a virtual enterprise expert which may intelligently add new information to a Virtual Representative. This new information may be sent over the Electronic Communication Network to intelligently update a Virtual Population instance corresponding to a Visitor. The Application Programmer Interface may also include a parameter which allows for a default piece of content to be displayed.

This expert system software desirably effects the expert systems of the present invention (e.g., the enterprise expert, the visitor expert, and the population expert, for example) and has numerous capabilities. For instance, such software is desirably capable of learning about the Virtual Population, can intelligently optimize enterprise goals, and is capable of generating new rules. Such software also may include a set of rules representative of expert knowledge and may include reasoning engine log information which may store self-observational expert events and learned information. This software is also desirably capable of making rule suggestions and is desirably programmatically accessible to outside systems. This software is also desirably capable of additional functions such as rule ordering to control execution.

In the present invention, the expert system software includes expert knowledge, and may include a consumer expert, e.g., an expert in the marketing and/or selling of goods and services. The expert system software may be deployed on a customer-hosted computer.

Reasoning or Inference Engine

The Inference Engine applies rules to a Fact Base in order to respond to one or more Virtual Visitors. It deduces the correct Real Estate to retrieve from the Customer Real Estate Library when interfaced by the API call through the Plugin.

Rule Base

The Rule Base is a database of rules that are applied to facts in order to make deductions. An example of a rule would be "IF Client_Is_Never_Before_Seen THEN Mall Promotion Area IS Default_MallPromo", or "IF (Client Visits>5) OR (Purchases>$60) Play $10_Gift_Certificate_Promo)".

A rule is successful if the normal rules of logic make the clause in the "IF" part of the rule true. Otherwise a rule is unsuccessful. For example, if a rule says "IF male and >45" and the Virtual Visitor is female, the rule will fail. The normal rules of logic apply. A list of conjunctions is true if all parts are true. A list of disjunctions is true if any part is true, e.g., if >45 OR <18 is true if either fact is true.

Virtual Population

A population of Virtual Visitors is held in a universal database. This database is accessible to one or more Enabled Sites. The population is rendered with a Rich Semantic Model.

Virtual Visitor Manager

The Virtual Visitor Manager manages the currently visiting Virtual Population. It loads Virtual Representatives into the Customer Data Store, adds newly learned information to the set of current Visitors, and sends newly learned information back to the Virtual Population Site. The Virtual Visitor Manager has embedded into it the knowledge of the Visitor Expert required to update a Virtual Visitor in real time to achieve the same results as the Visitor Tool achieves.

Visitor Tool

This tool allows a Visitor to update her Virtual Representative. For example, the Virtual Visitor Expert may interact with the real world Visitor through the Visitor Tool. Additionally, the Virtual Visitor Expert may interact with the real world Visitor through the Visitor Tool to restrict access to at least some information in an instance of the Virtual Population under the control of the real world User. A Reasoning Component effects the Visitor Expert that intelligently manages this engagement online. The goal of the Visitor Expert is to assist in maintaining a self-consistent and rich model which is as correct and complete as possible. While the Visitor Tool can add new facts to maintain a self-consistent profile, the Visitor Tool is more complex in that it engages in real time interaction with the Visitor and, as such, can prompt for new and related information, for example.

The following is an example of the interaction of certain components of the present invention to achieve dynamic content and personalization, dynamic optimization, Visitor learning, and Visitor management of the relationship, for electronic retail stores and a population of consumer Visitors on the World Wide Web.

One or more electronic stores are enabled with the technology of the present invention with a simple installation. The installation includes a Plugin which provides programmers with access to two API calls that provide Real Estate management and Visitor learning support. The API may comprise a parameter which allows for a default piece of content to be displayed should the system employed in the present invention not be responding. Also included in the Plugin is a Reasoning Component and other supporting components that effect the electronic retail Enterprise Expert. At the electronic store site(s) is also installed the Enterprise Expert's Toolset which provides web access to a Rule Editor, Report Generator, and Content Library Management Tool. Both the Plugin and Enterprise Expert's Toolset are described further herein.

In one aspect of the invention, the Plugin provides the API, the Expert Reasoning Component for the Enterprise, the network access code that allows access to the Virtual Population, Customer Data Store access which manages local data store requirements needed by the systems, and the Virtual Visitor Manager which manages Virtual Visitor updates.

A Virtual Population of consumers is available to the electronic retail stores. The consumer population has been richly semantically modeled and is available on the network through supporting software provided by the system of the current invention. The population has been modeled to account for relevant consumer knowledge applicable to retail selling. Simple facts, preferences, and behavior are accounted for in a rich and changeable, but fixed, model. This model is inherently understood by the retail site Cyber-Expert which will dynamically use this knowledge to achieve Enterprise and consumer goals. Instances of the Virtual Population are either anonymous or known. Known instances can be edited and managed by the Visitor Tool described herein. Anonymous members of the Virtual Population do not contain personally-identifiable information.

In one configuration of the system of the current invention, as a Visitor comes into the electronic retail store, the corresponding Virtual Representative is loaded over the Internet to the electronic commerce store site and is held in memory until the Virtual Visit is completed. If the Visitor is anonymous, a cookie is used to index an anonymous representative from the Virtual Population. If the Visitor is known, cookies or other technology, such as e-wallet technology or other infomediary technology, is used to index the Virtual Population correctly.

The Rich Semantic Model of the Virtual Population is one which is rich in meaning. Semantic Modeling is an artificial intelligence technique for providing rich renderings of complex things.

The electronic retail stores have coded their Sites to use the provided API. Code is added to the web pages of these Sites wherever it is desirable to have the Enterprise Expert decide what is the best Real Estate to put on pages. These decisions are made dynamically as web pages load by the Enterprise Expert. Any amount of Real Estate on any number of pages can be managed with Real Estate Calls. The Real Estate Call basically calls the Enterprise Expert, tells the Expert the area of the page for which it needs a decision, and for which Virtual Visitor it is personalizing the experience. The Enterprise Expert uses built-in expert knowledge (in this case retail knowledge), knowledge about the particular Virtual Representative, and knowledge of the marketer as expressed in the rulebase, to decide how best to personalize the Visitor experience. Any number of Virtual Visitors are managed by the system of the current invention. The first time that the Content Management Call is made without a recognized Virtual Visitor, the Plugin will use the Virtual Visitor Manager to obtain the Virtual Representative of the Visitor from the Virtual Population.

New information learned about Visitors at the Site can also be dynamically added and used while the Virtual Visitor visits at the electronic store. For example, suppose the marketer (Enterprise Expert) decides that it is desirable to record preferences for particular sports and that such a preference can be determined from past purchase behavior. Programmers can be instructed to use a second API call of the current invention to record such a preference at any time during the visit. As another example, new facts may be learned from a survey which the Visitor fills out at the Site. The Virtual Visitor Manager, part of the Plugin, manages Virtual Visitor updates, intelligently updating the Virtual Representative in real time and sending information updates back to the Virtual Population. In this way, new information is available immediately as well as when the Visitor returns or goes to another Enabled Site. This API call can be used to add or update any aspect of a selected Virtual Visitor which is instantly made available to the Enterprise Expert.

Marketing and other Real World Experts have provided the Real Estate to be managed by the system of the present invention by adding this Real Estate to the Customer Real Estate Library using the Content Library Management Program Interface. The Content Library Management Tool stores the location, label, and other information such as annotations for each piece of Real Estate to be managed by the system. It does not store the Real Estate itself. Once a Real Estate label has been entered, it is then available as a Real Estate choice within the Rule Editor. Such Real Estate can be any code and images that can appear on a web page. For example, product images, product lists, store departments, offers, and entire web pages can be managed by the system. Real Estate is completely arbitrary and can be anything that can appear on a web page.

Once the desired Real Estate is entered in the system and Site coding is complete, the only thing left to do is enter rules, using the Rule Editor, to be used by the system. These rules are typically entered by the marketing expert (Enterprise Expert). For each area to be managed by the system, the area is labeled and rules are added. This is easy to do as the Rule Editor interface is desirably point-and-click. This is possible because the Semantic Model, while changeable, is fixed, and available Real Estate is known. An example of a rule might be "IF male AND income>$100K AND frequent buyer THEN MainPagePromotion IS "FrequentCustomerPromoMale". "MainPagePromotion" is a Real Estate area on the main page and API calls looking for the correct Real Estate will refer to it. "FrequentCustomerPromoMale" is a piece of Real Estate in the Customer Real Estate Library with display characteristics likely to appeal to males.

The Rule Editor desirably supports a rule language in agreement with the Semantic Model and the expert system software used in the present invention. Additionally, it desirably supports a simplified rule language which is understood by such expert system software. The Rule Editor also supports an arbitrary number of conjunctions and/or disjunctions in the rule language supported by such expert system software, supports categories, supports a default rule that succeeds when no other rule has succeeded, and supports any other typical or natural expert construct available to such expert system software.

The rule stated above could also be expressed using "Preferred Male Customer" if a category was defined in the rule editor defining "Preferred Customer" as "male AND income>$100K AND frequent buyer". Real World Experts would use this technique if they expect to create many rules using such a concept as "preferred male customer".

Rule ordering is important. If the marketer or other Real World Expert adding rules to the system has a goal to sell a truckload of blue widgets before selling other items, then widget rules are placed before other rules in a set of rules for a particular web page area. Only one piece of Real Estate can be shown in a given area and the first successful rule is used.

The Visitor Tool of the current invention is used by the consumer to access and manage her Virtual Representative. The tool is web-enabled and allows for secure and protected access to the instance of the Virtual Population that represents her. The tool can be used to enter a new Virtual Representative, or change the existing representative or its use. Information can be added or deleted, and the use of information in the representative can be managed. For example, it can be specified which retail stores are allowed to use the information. The Visitor Expert applies expert Visitor knowledge to interact with the User and assists in obtaining information about the User that is complete and self-consistent. The Visitor Expert may also interact with the Visitor to suggest information-sharing options.

Naturally, the Visitor Tool only applies to instances in the population that are not anonymous. Anonymous Virtual Representatives cannot be accessed by the Visitor Tool.

A Population Expert applies expert knowledge to the aggregate Virtual Population to exploit the aggregate knowledge therein and to mine Visitor similarities and behavior patterns. The Population Expert is designed to suit particular populations.

To summarize briefly, content is made dynamic with the system of the current invention because decisions as to which Real Estate to display are made in real time by the Enterprise Expert (e.g., marketing expert) as the electronic store web pages are displayed. Content is dynamically personalized because the unique nature of the individual is used throughout the Visitor's Virtual Visit to the electronic store. Dynamic optimization is achieved because newly learned information is recorded and applied in real time as the Visitor is visiting. Dynamic optimization is also realized because the Enterprise Expert (marketing expert) has inherent knowledge about retail selling. Additional optimization is achieved because aggregate information is gained and shared at all Enabled Sites. Finally, optimization is achieved because the goals of the Enterprise Expert (marketing expert), as expressed in entered rules, have been entered to support the goals of the Enterprise. Aggregate knowledge is exploited and increased by the Population Expert. Visitor management of the relationship is afforded through the Visitor Tool and the supporting Visitor Tool technology of the system of the current invention.

Figure 5:
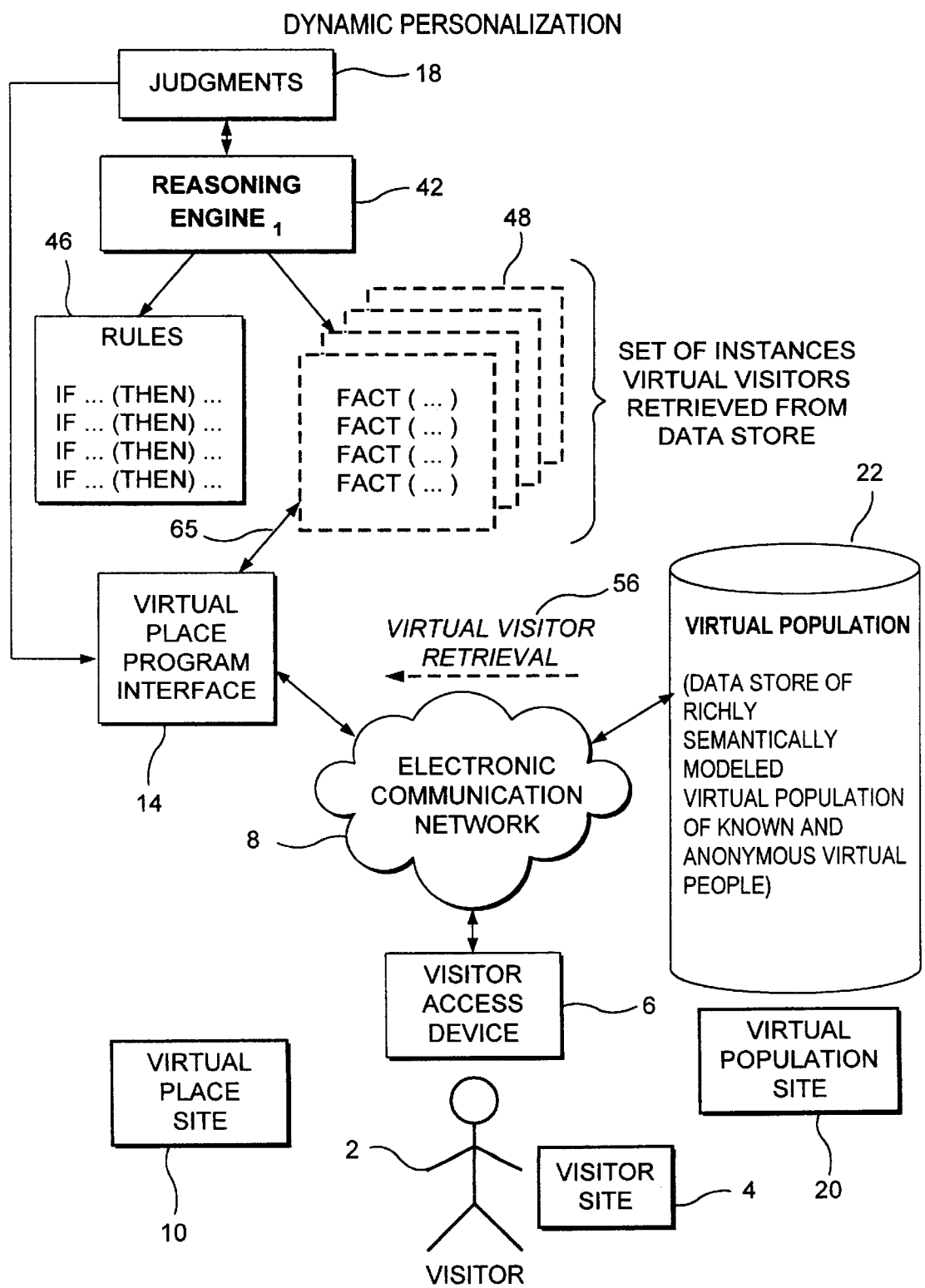
FIG. 5 is a schematic emphasizing the dynamic personalization aspect of one use of the present invention. Reasoning Component$_1$, as expanded in FIG. 4, applies expert knowledge to effect a personalization experience at a Virtual Place for a particular type of population, such as a consumer population. As such, Reasoning Component$_1$ is shown passing judgements to the Virtual Place Program Interface, thus dynamically altering the visitation experience of the Visitor. API calls to manage Real Estate are used within the code of the program interface shown. The additional arrow connecting the Virtual Place Program Interface code and the set of Virtual Representatives currently visiting the Site indicates calls to the Visitor learning API call. Newly learned Visitor information is added to the resident Virtual Representatives in real time at the Site and is sent back to the Virtual Population. This is done through the Virtual Visitor Manager 42 shown in FIG. 9.

Turning to FIG. 1, a Visitor 2 at a particular Site accesses an Electronic Communication Network 8, such as the Internet, using a Visitor Access Device 6 which is present at a Visitor Site 4. The Visitor 2 visits a Virtual Place at Site 10, which is desirably representative of a place in the real world, on the Electronic Communication Network 8 by interacting with a Virtual Place program interface 14. For example, the Virtual Place at Site 10 may be a virtual store, virtual library, virtual country or other such representation of a real entity. The Visitor 2 exists on the Electronic Communication Network 8 as a Virtual Visitor. This Virtual Visitor has a corresponding instance which fits the Rich Semantic Model of Virtual Population 22. As the individual Visitor 2 accesses an Enabled Site, i.e. a Virtual Place at Site 10 which has deployed a system and process of the present invention on a computing device in the Electronic Communication Network 8, the Visitor 2 is recognized as having previously been to the Enabled Site or as a first time Visitor. As illustrated in FIG. 5, if the Visitor 2 has previously visited any Enabled Site, or has a Virtual Representative in the Virtual Population 22 as a result of having entered an Enabled Site as show in FIG. 7, a message is sent to the Virtual Population Site 20 where information relating to her Virtual Representative resides, and the Virtual Representative of the Visitor 2 is retrieved. This Virtual Visitor is a specific Virtual Population 22 instance in the Rich Semantic Model which contains information about the Visitor 2. This Virtual Representative of the Visitor 2 is recognized as having preferences, behavioral information, and simple facts about the Visitor 2. Samples of these types of information are described further herein.

Figure 10:
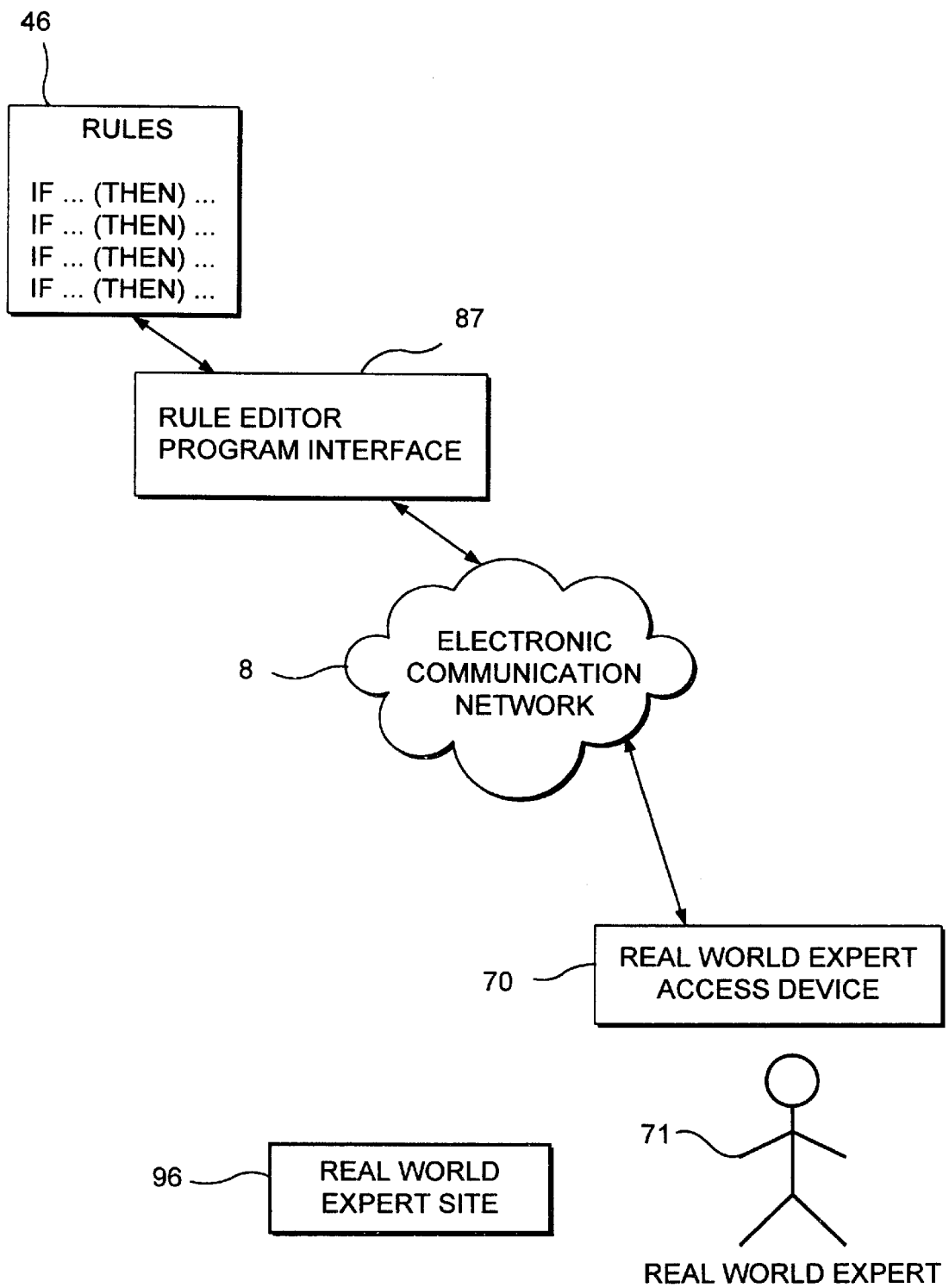
FIG. 10 shows part of a Toolset provided with the present invention. A Real World Expert is provided a network-enabled program and program interface that allows rule editing. This is desirably a "point-and-click" interface in that allows the expert to compose rules. The interface can be point-and-click because the Semantic Model, while changeable, is fixed.

As shown in FIG. 1, the Virtual Place at Site 10 (Enabled Site) has associated with it expert system technology employing an Enterprise Expert 16 which includes a Reasoning Component which has been tailored to a particular Virtual Population 22 and to a particular Enterprise, of which the Virtual Place at Site 10 is an example. As shown in FIG. 10, the Reasoning Component is desirably tailored to an Enabled Site by entering rules 46 which are specific to the Enterprise. For example, Site 10 may be an electronic retail store and the Virtual Population is a population of modeled retail shoppers. As seen in FIG. 4, within a Reasoning Component are included a set of rules 46, 46', or 46", which are designed to serve the goals of the Enterprise, and a Reasoning Engine 42, 42', or 42". Generally, rules 46, 46' or 46" are applied to facts 48 to achieve judgements 18, 28, or 36, respectively. From within the set of facts 48, Reasoning Engine$_1$ applies the description of a Virtual Representative stored as an instance which conforms to the Rich Semantic Model of the Virtual Population 22 to the rules 46 to make a judgement 18. Judgements made personalize the experience of the Visitor 2 at the Virtual Place at Site 10.

Figure 3:
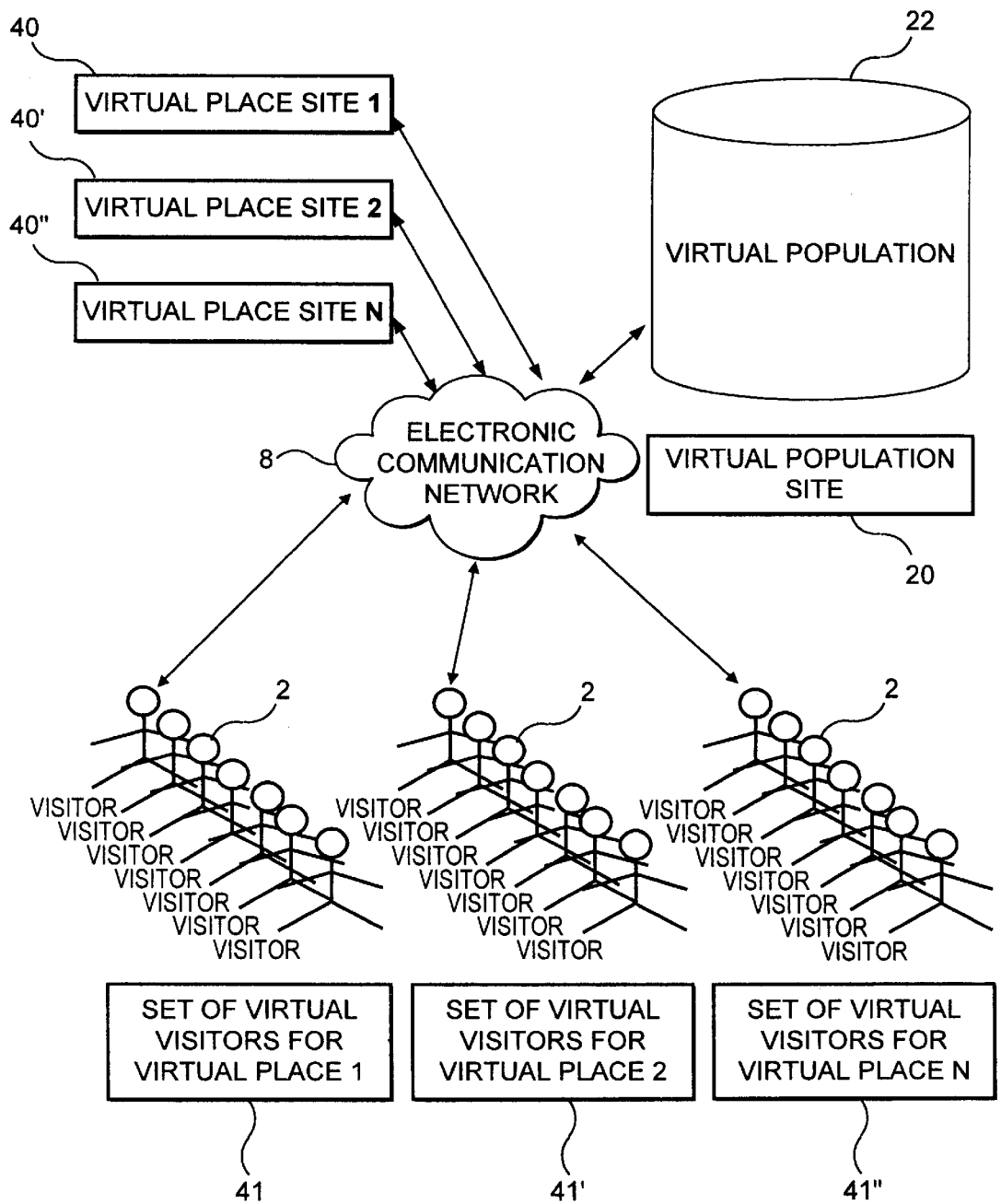
FIG. 3 is a schematic of the system where multiple Sites use the same Virtual Population. Visitors moving from Virtual Place to Virtual Place will have their Virtual Representative available for use automatically by Sites enabled with the system of the present invention. Further, due to automatic updates to their Virtual Representative, the most accurate representative is always available.
Figure 9:
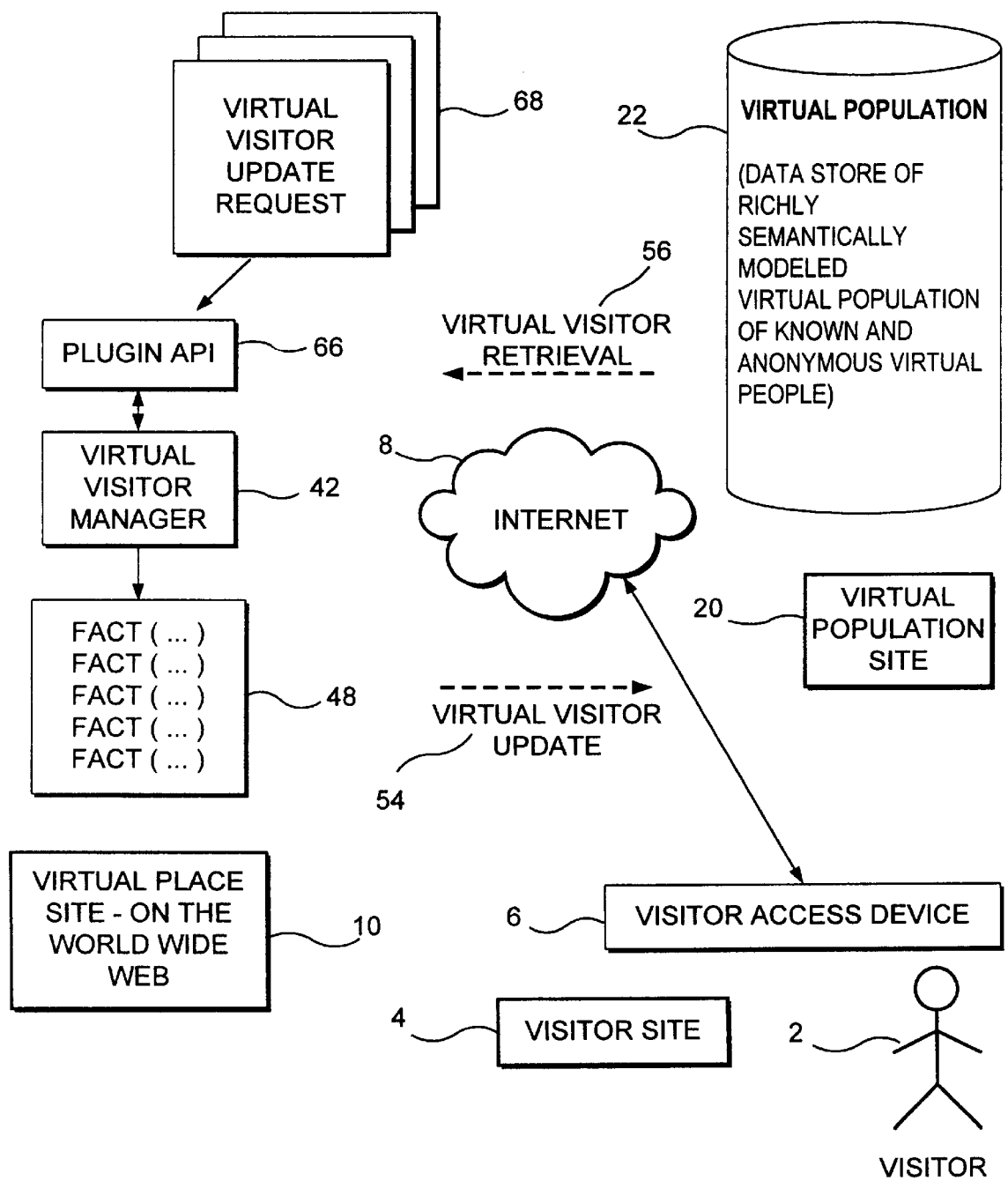
FIG. 9 emphasizes the management of dynamically learned information about Virtual Visitors. As such, it shows a component not previously shown, the Virtual Visitor Manager. The Plugin API provides programmer access to add newly learned information about a Visitor at the Site via the Virtual Visitor Manager. This new Virtual Visitor information is added to the Virtual Representative instantly and is also passed back to the Virtual Population Site. The Virtual Visitor Manager has a subset of the knowledge of the Visitor Expert, as it must intelligently add new information to a Virtual Representative. The Enterprise Expert has instant access to newly learned information. Any number of tools and methods, such as click stream analyzers and data mining tools, may be interfaced to the technology of the present invention by accessing the Virtual Visitor Manager. The Visitor learning API call, accessible through the Plugin, provides a software access mechanism that can be used to update the Virtual Visitor with information learned through other software tools.

Referring now to FIG. 5, the Reasoning Engine 42, also referred to as an Inference Engine, has the function of applying rules 46, which have been specifically designed to the needs of the organizational entity which is responsible for the enabled Virtual Place at Site 10, to facts 48. It reasons by applying the rules 46 to the facts 48 which are retrieved from the Virtual Population 22 at the Virtual Population Site 20. Several sets of such facts 48 correspond to any number of Visitors 2 at any number of Visitor Sites 4, as shown in FIGS. 3 and 5. In fact, as shown in FIG. 3, any number of Sites may also access and use the same Virtual Population 22, such as Sites 40, 40' and 40" enabled with the technology of the present invention. As shown in FIG. 5, this results in judgements 18 which are transmitted to the Virtual Population Site 20 to dynamically update the specific instance within the Virtual Population 22 and which are used to provide a customized visitation experience to the Virtual Visitor representing the Visitor 2. As shown in FIG. 4, the Reasoning Engine also has associated therewith a log of Reasoning Engine files 44 which communicate with a Reasoning Engine 42, 42', or 42" to store data utilized and gained by the Reasoning Engine 42, 42', or 42". As shown in FIG. 9, Virtual Visitor update requests 68 are made to the Virtual Population 22 for a Virtual Visitor at Site 10. The Virtual Visitor is subsequently retrieved 56 from the Virtual Population 22 and new information about the Visitor 2, represented by this Virtual Visitor, is then used by the Enterprise Expert 16 to customize the Visitor's 2 visitation experience at the Virtual Place at Site 10. FIG. 9 also shows an additional component, Virtual Visitor Manager 42, which is used to dynamically add new facts to a set of facts 48 comprising a Virtual Visitor. The requests for such facts updates may come from a program directly or from judgements 18. Virtual Visitor update requests (programmatic requests) 68 are achieved through the Plugin interface API 66 and Virtual Visitor Manager 42. Virtual Visitor Manager 42 also desirably automatically sends Virtual Visitor (Representative) updates 54 over the Electronic Communication Network (such as the Internet) 8 to Virtual Population 22. Subsequent Virtual Visitor retrieval 56 to any Enabled Site will contain such Virtual Visitor updates 54.

Referring again to FIG. 1, the Virtual Population Site 20 desirably also has associated therewith expert system technology including a Population Expert 26 which includes a Reasoning Component. As shown in FIG. 4, this Reasoning Component also includes a set of rules 46' which are applied to facts 48 relating to the specific instances of the Virtual Population 22 by a Reasoning Engine 42' to reach a judgement 28 with respect to the overall Virtual Population 22. This is illustrated diagrammatically in FIG. 6. The Population Expert 26 applies its expert knowledge of a Virtual Population 22 to achieve additional knowledge 50 about the Virtual Population 22 for future reasoning thereon. Thus, knowledge 50 regarding the Virtual Population 22 augments and updates population 22 dynamically in accordance with the judgements 28 made by the Population Expert 26. Additionally, judgements 28 regarding the Semantic Model may also be made, which in turn may augment the model relating to a specific Virtual Population 22. As an example, likely preferences may be added to all members of a population based on expert reasoning on that population and may be added to the Rich Semantic Model of the population. Such judgements 28 have been made in accordance with the expert knowledge of the population contained in Population Expert 26.

The present invention is not limited to a particular number of expert systems, and therefore is not limited to a particular number of Reasoning Engines or sets of rules which these engines apply to specific facts. A first Reasoning Component is basic to the architecture of the present invention and is tailored to a particular Virtual Population 22 and to a particular Virtual Place at Site 10. This Reasoning Component contains at least one Reasoning Engine 42. As stated above, this Reasoning Engine 42 is used to apply facts 48 which related to a specific instance of the Virtual Population 22. Rules 46, which are tailored to the Virtual Place at Site 10, are applied to the facts 48 relating to a specific instance of the Virtual Population 22 to reach judgements 18. As shown in FIG. 4, these judgements 18 are used to produce personalized decisions 50 about the specific instance. As a result of the mutual exchange of information between the Visitor 2 and the Enterprise Expert 16, the Reasoning Component determines the type and content of images to display at the Enabled Site 10 which are viewed by the Visitor 2 at Visitor access device 6.

Figure 6:
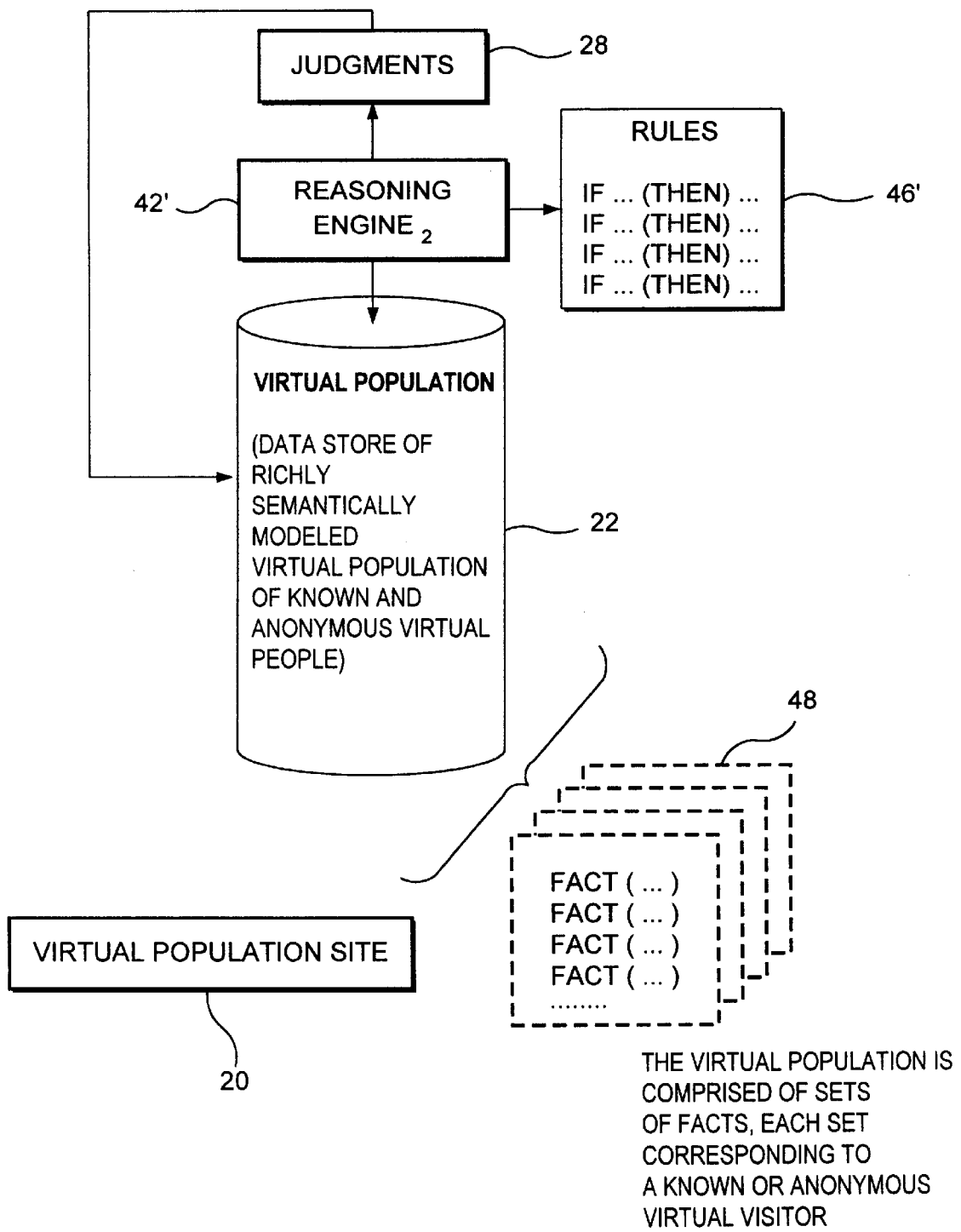
FIG. 6 is a schematic emphasizing Virtual Population learning. The Population Expert, tailored to the type of populations represented, reasons to produce new information about the population. For example, population purchasing behavior analysis may produce new observations on consumer preferences. Another example would be to scan the Virtual Population to learn likely cross-sell items based on aggregate consumer purchase behavior information.

Further, as discussed above, a second Reasoning Component is also tailored to a particular Virtual Population 22. As seen in FIGS. 1 and 6, this Reasoning Component is also comprised of a Reasoning Engine 42' and a set of rules 46' designed for a particular Virtual Population 22. These rules 46' desirably relate to aggregate knowledge of the Virtual Population 22, as opposed to specific instances of the Virtual Population 22. The Reasoning Engine 42' applies these rules 46' to facts 48 about the Virtual Population 22 and makes judgements 28, representing a gain in knowledge about the Virtual Population 22 as an aggregate. Sets of facts 48 comprise the Virtual Population 22, with each set of facts 48 corresponding to a known or anonymous Virtual Visitor. Dynamic modification or augmentation of the rules 46' for the Virtual Population 22, or the Virtual Population model per se, can be made as a result of such reasoning.

Figure 2:
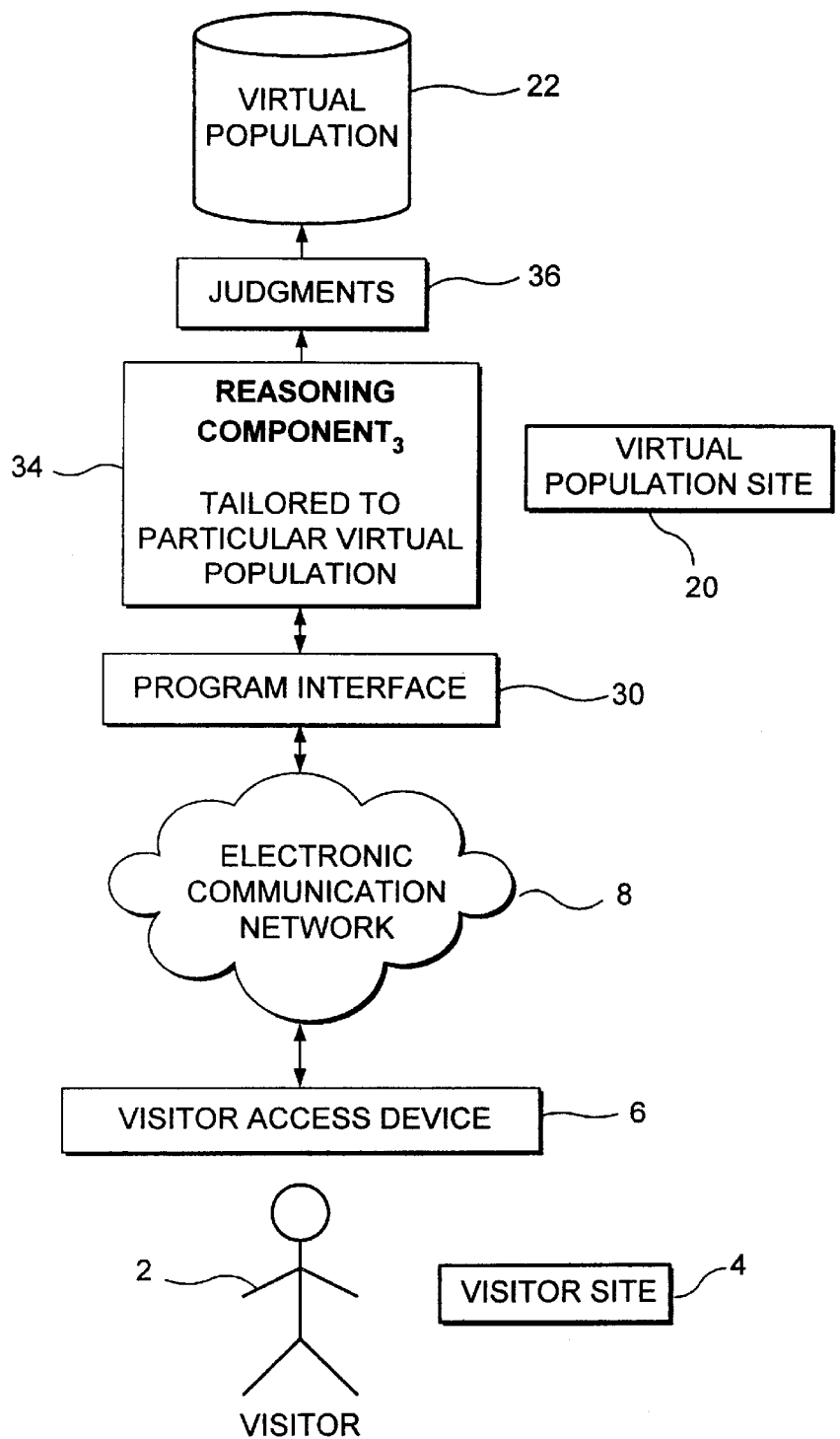
FIG. 2 is a continuation of FIG. 1. It repeats the Electronic Communications Network, the Visitor Site and Virtual Population Site of FIG. 1. An additional component, Reasoning Component$_3$, effects a Visitor Expert. This expert understands individual instances in the Virtual Population and is accessed by a program interface that provides the Visitor access to the corresponding Virtual Representative for the purposes of allowing the Visitor to access, view, and change the correspondent Virtual Representative in the Virtual Population. This is done in such a way as to maximize the value of learned information, maintain the integrity of the Population, understand and act upon any ramifications of learned information to the Virtual Population at large, and present the Virtual Representative to the User in an easy to understand manner.
Figure 7:
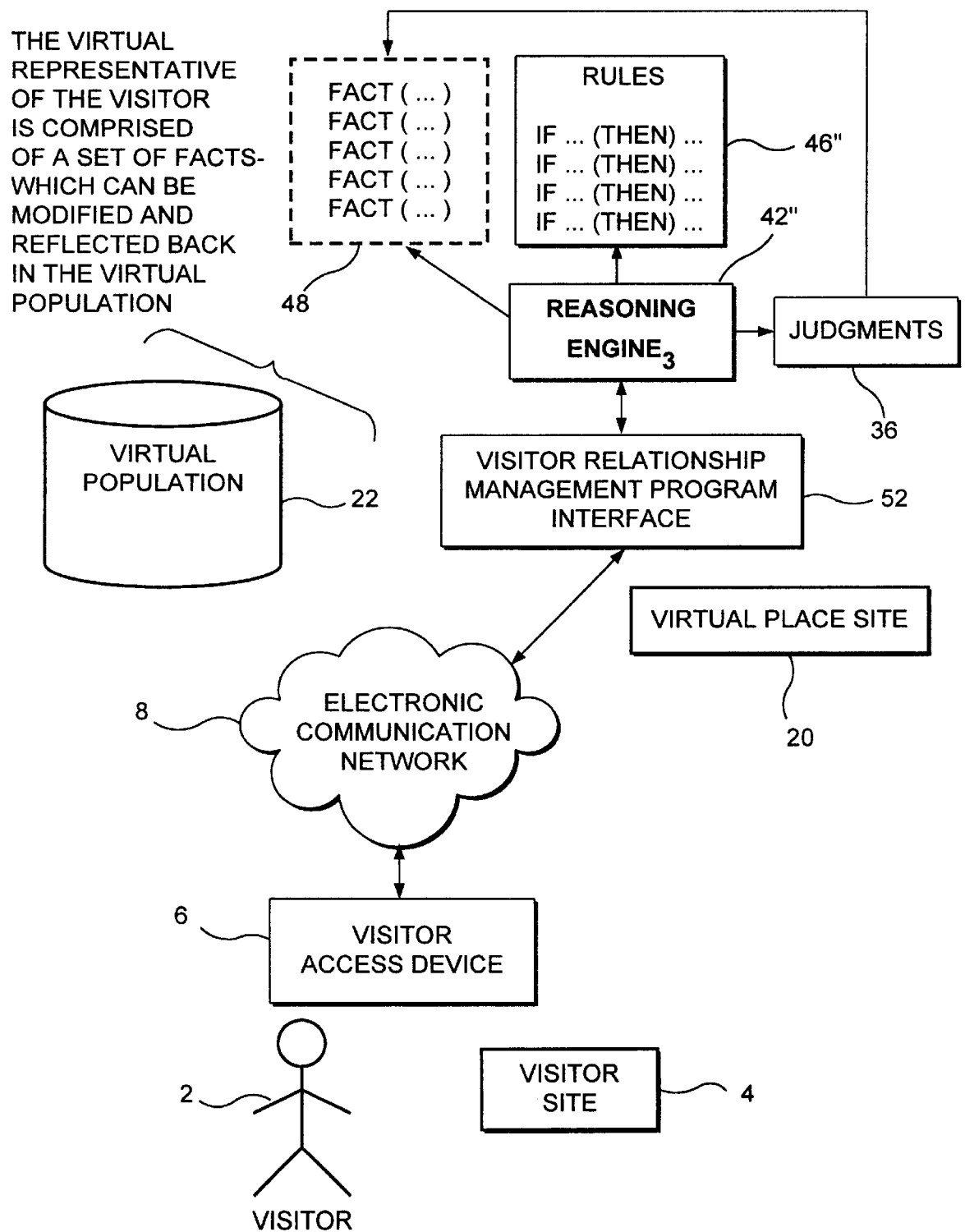
FIG. 7 is a schematic emphasizing the Visitor management end of the relationship between the Visitor and Virtual Reality Cyber-Experts. Providing the Visitor access and control over their Virtual Representative respects the individual, involves the individual, and gives the individual control over how they are perceived, what they do and do not want to be known about them, and how they wish information about them to be shared amongst Enabled Sites.

As shown in FIGS. 2 and 4, a Visitor Expert 34 includes a third Reasoning Component, a set of rules 46" designed for a particular Virtual Population 22, and a third Reasoning Engine 42" which is designed to act on the specific facts 48 which describe a particular Virtual Representative. The Reasoning Engine 42" is designed to assist the Visitor 2 in modifying her Virtual Representative by applying these rules 46" to the facts 48 which describe this Virtual Representative. In this manner, the Virtual Representative can be directly defined by the Visitor 2 with the assistance of the Reasoning Component. Judgements 36 modify the Virtual Representative in accordance with the User's wishes, and Visitor Expert 34 interacts with the User to maximize the usefulness, accuracy, and value of information entered. As shown in FIGS. 2 and 7, a Visitor relationship management program interface 30 permits communication between the Visitor Expert 34 and the Visitor 2 using access device 6 across an Electronic Communications Network 8.

It should be noted that any Reasoning Component has the intelligence to report on its activities and its understanding of what it is doing, as well as on newly learned information. Log files 44, as shown in FIG. 4, are used for this purpose. Newly learned information can include Visitor learnings and result in rule suggestions.

The present invention can also be used to allow for the management of multiple Virtual Places at Sites 40, 40', and 40" with the same Virtual Populations 22, as shown in FIG. 3. Sets of Virtual Visitors 41, 41', and 41" access the Virtual Places at Sites 40, 40', and 40" through the Electronic Communications Network 8. In this example, the model for the Virtual Population 22 is the same for all Virtual Places at Enabled Sites 40, 40', and 40". If the Virtual Places at Sites 40, 40', and 40" are all clothing stores, a specific model may be designed specific to the Virtual Population 22 which is expected to visit these Sites.

Figure 8:
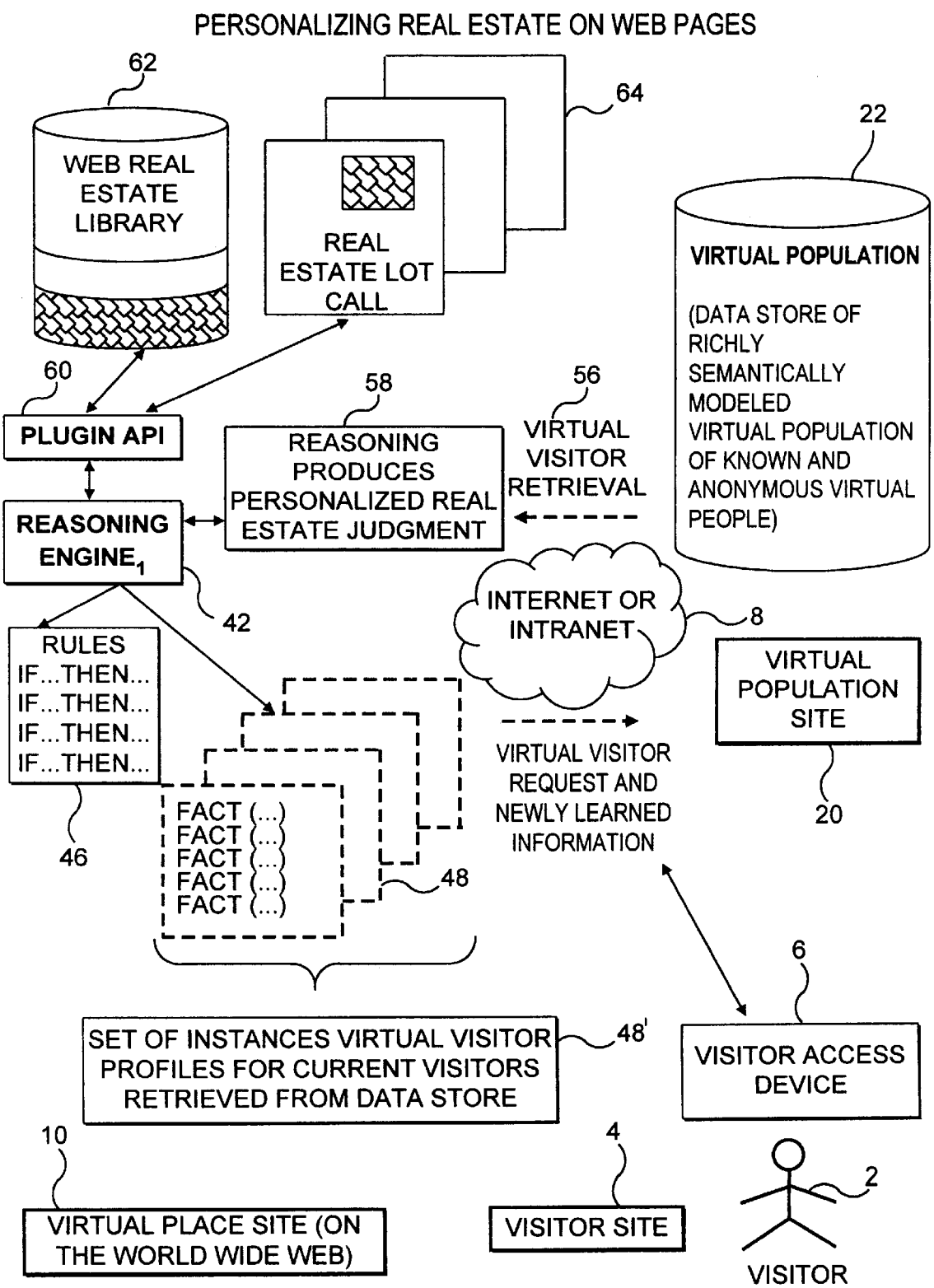
FIG. 8 is a schematic showing the personalization of any amount of web page Real Estate on any number of pages. Virtual Visitors are transported over the Internet as they enter a Virtual Place for the duration of the visit. Plugin software provides web programmers access to the Enterprise Expert that decides which Real Estate to retrieve. This Real Estate is completely arbitrary. For example, it can be an offer to sell, a picture that the Visitor is likely to enjoy, or a colored background reflecting the Visitor's known preferences. The Plugin also provides programmer access to add newly learned information about the Visitor at the Site. This is explained in more detail in FIG. 9. This new Virtual Visitor information will be made available in real time to dynamically alter the visitation experience and is also made available over the Internet at the Virtual Population Site. A configuration allowing for access over an Intranet is supplied. In such a case, the Virtual Population Site and the web site are on the same Enterprise Network.

In one aspect of the invention, when a Virtual Visitor has been requested and retrieved from Virtual Population 22, the Enterprise Expert 16 applies rules 46 to facts 48 using a Reasoning Engine 42 to produce a personalized Real Estate judgement 58, as shown in FIG. 8. A Real Estate lot call 64 is placed to the Reasoning Engine 42 by a Virtual Place at Site 10 that the Virtual Visitor is visiting. This call is made by a Plugin 60 which applies the personalized Real Estate judgements 58 made by the Enterprise Expert 16 to call a Customer Real Estate Library 62 to select appropriate Real Estate, i.e., a portion of a User interface web page, to be shown to the Visitor 2 at the Enabled Site. The particular images shown to the Visitor 2 dynamically change as judgements 58 are made and processed. Further, calls 68 to update Virtual Visitors are made at Site 10 using a Plugin API 60. When these calls are placed, the update request 68 is made over the Internet or Intranet 8 to the Virtual Population Site 20 which updates Virtual Visitor in the Virtual Population 22 and also updates the Virtual Representative at the Virtual Place at Site 10 with changes to appropriate facts 48.

Figure 13:
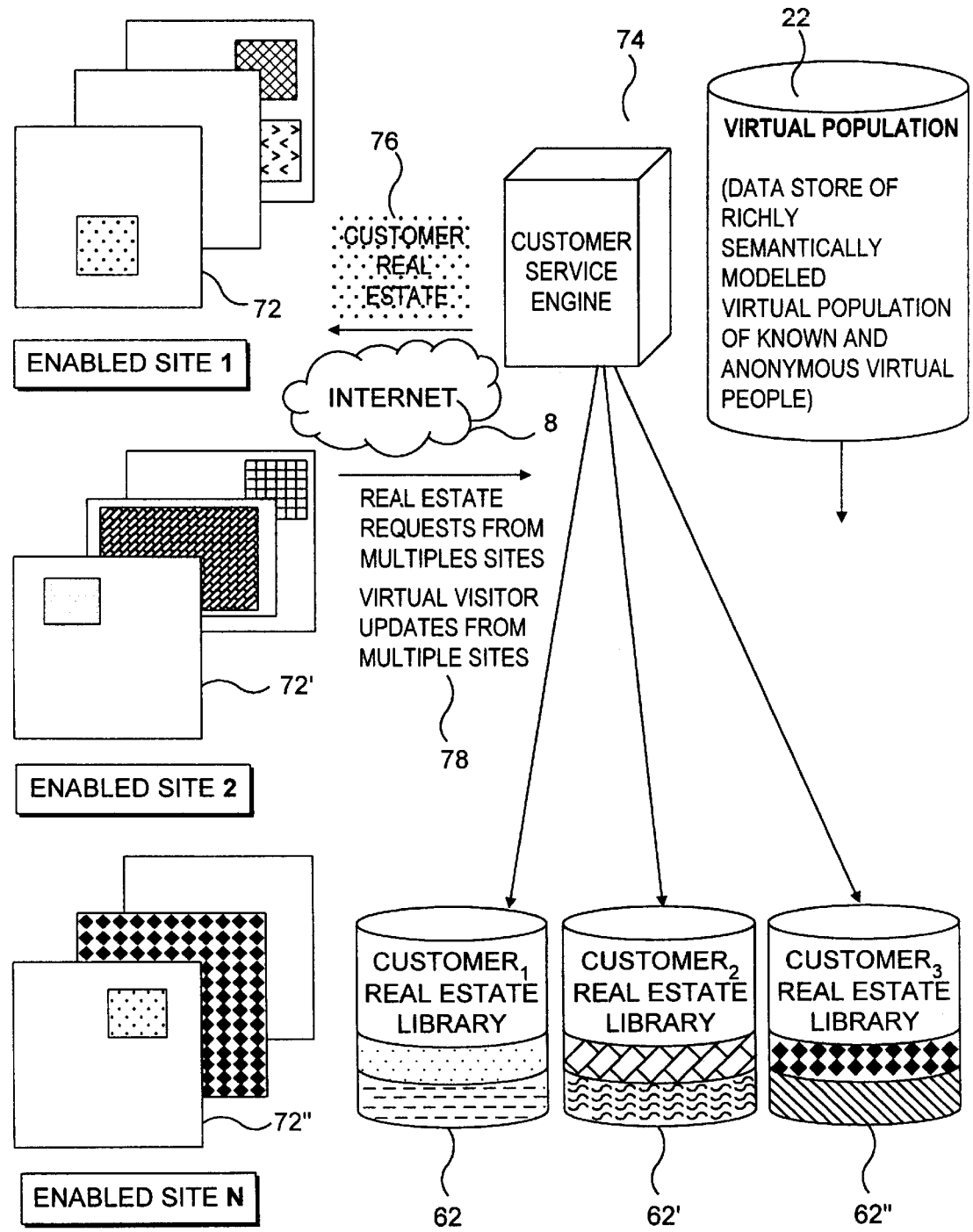
FIG. 13 is a schematic representing a different configuration of the system of FIG. 8. The technology of the present invention allows for deployment of the components in such a way as to allow for remote management of most aspects of the system. In this model, only the requests to the Plugin remain locally at the Enabled Sites. They are relayed to the remote Site via a proxy agent, not shown. The system is functionally equivalent to the system in FIG. 8, the only difference being in distributed computation.

The present invention may also be used in a configuration to remotely manage personalized Real Estate for many Customers from a central location. This is an alternative to Real Estate being stored at the Customer Site, as in FIG. 8. As shown in FIG. 13, calls 78 for Real Estate and Virtual Visitor updates are made by multiple Enabled Sites 72, 72', and 72" across an Electronic Communications Network 8. These calls are received by a Customer Service Engine 74 which communicates with the Virtual Population 22 to retrieve instances of the Virtual Population 22. Real estate is selected from Customer Real Estate libraries 62, 62', and 62" by the Customer Service Engine 74 based on the selected instances from the Virtual Population 22. Such instances correspond to current Visitors 2 at Sites 72, 72' 72" The selected Real Estate is then sent 76 across the Internet 8 to the appropriate Enabled Sites 72, 72', and 72" where the Real Estate is viewed by the Visitors 2, as in FIG. 3. Instances of Reasoning Components as in FIG. 4 are all located at the central Site for each Enabled Site 72, 72', 72". Each such Enabled Site has a special version of the Plugin 60 which serves to proxy API calls across the Electronic Communication Network 8 for remote resolution.

Referring to FIG. 10, a Real World Expert 71 at a particular Site 96 accesses an Electronic Communications Network 8, such as the Internet, using a Real World Expert access device 70 which is present at Real World Expert Site 96. The Real World Expert 71, accessing a rule editor program interface 87, accesses a set of rules 46 for the purpose of editing them. Rules 46 can be added to, deleted from, and changed in accordance with the purpose and expert knowledge of Real World Expert 71. Rules 46 can be ordered to suit expert goals. The language of the rules 46 is supported such that the rules understand population and Enterprise-specific goals. For example, a rule language which supports "IF NEVER SEEN BEFORE" is a useful rule in e-commerce applications.

Figure 11:
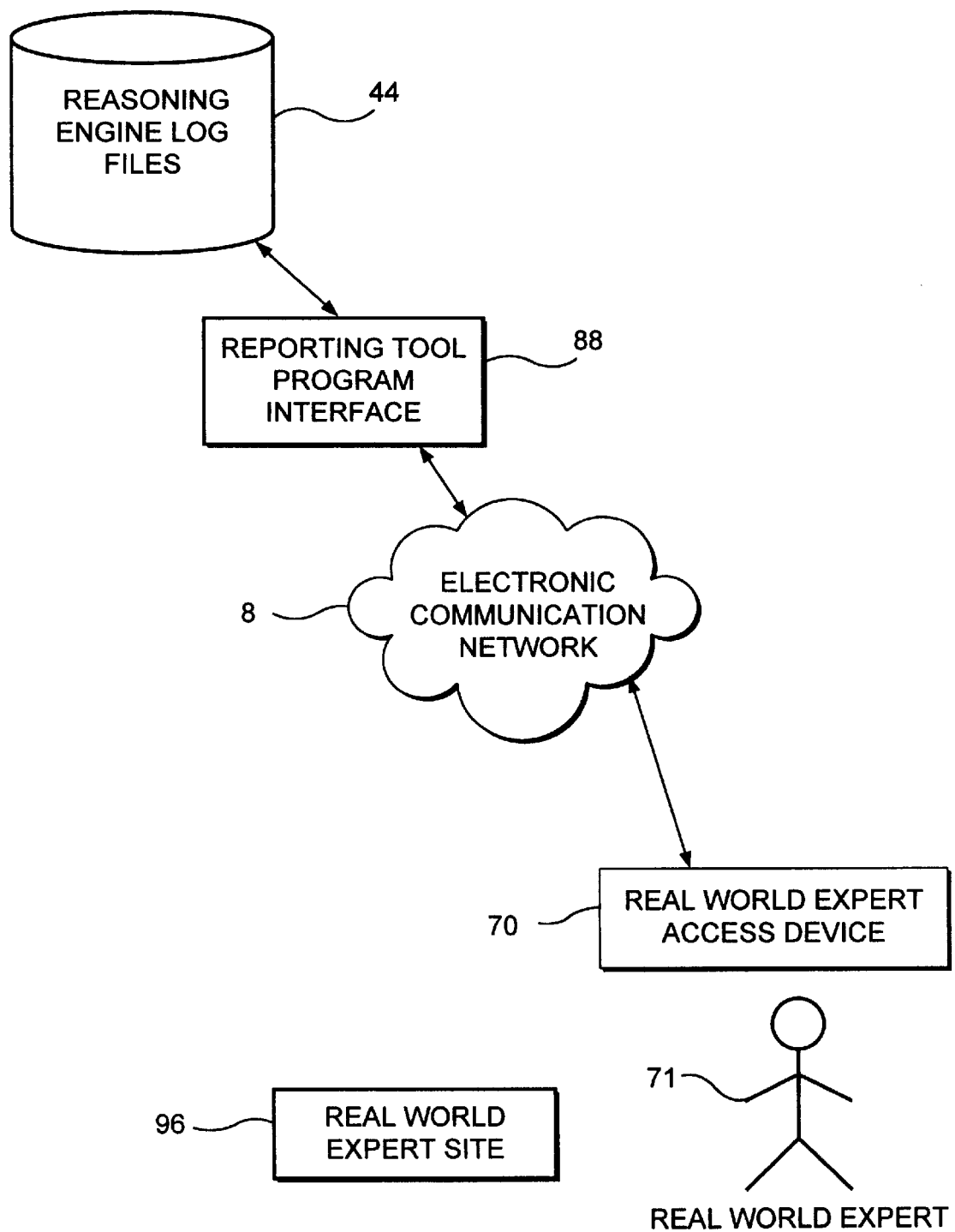
FIG. 11 shows another part of the Toolset provided with the present invention. A Real World Expert is provided a network-enabled program and program interface that allows reporting. The Enterprise Expert has recorded a vast amount of information about all of its decisions in the Reasoning Engine log files, as shown. Examples of such information are all Visitors who have been at the Site, all Virtual Visitor update requests, and the like. These log files are accessible to produce reports.

Referring to FIG. 11, a Real World Expert 71 at a particular Site 96 accesses an Electronic Communications Network 8, such as the Internet, using a Real World Expert access device 70 which is present at Real World Expert Site 96. The Real World Expert 71, accessing a reporting tool program interface 88, selects reports that are to be viewed, printed, or saved on an electronic Storage Medium. Reports are selected by the Real World Expert 71 in accordance with the purpose and expert knowledge of the Real World Expert 71. Software in support of reporting tool program interface 88, which retrieves the correct information from Reasoning Engine log files 44, may also be present (not shown). A Customer Data Store (not shown) may also be utilized in the present invention to store and mange the Reasoning Engine log files.

Turning to FIG. 12, a Real World Expert 71 at a particular Site 96 accesses an Electronic Communication Network 8, such as the Internet, using a Real World Expert access device 70 which is present at Real World Expert Site 96. The Real World Expert 71, accessing a content library management program interface 89, adds Real Estate to Customer Real Estate library 62 by indicating where such Real Estate reside and how it should be labeled. Software which adds labels and pointers, as well as additional relevant information such as annotations, to a Customer Data Store may also be utilized by the present invention for storage management (not shown).

In the examples that follow, e-commerce is the assumed application. As such, the Enterprise Toolkit is called the Marketer's Toolkit, and the assumed Virtual Population is a g population of consumers.

EXAMPLE 1

A Known Visitor

This example illustrates how simple facts, preferences and behavior are used at a web site enabled with the technology of the present invention to dynamically offer a unique visitation experience designed for a particular Virtual Visitor. The Visitor's name is Beatrice. Beatrice comes into an enabled e-Store (electronic-Store) website (Site). She is a frequent visitor to this site and has made several purchases. Because she has made 3 or more purchases, a promotional incentive is offered to her as she enters the store. The promotion offers a $30.00 gift certificate if she will fill out a questionnaire about store services and personal shopping experience. After she leaves the home page where the offer appears, Beatrice goes to her favorite section in the store, the sports section, where she has made many purchases. She buys her third pair of sport shorts at the store. A new preference for sports clothing is dynamically added to Beatrice's Virtual Representative. This representative is a specific instance of a Virtual Population of consumers that corresponds to Beatrice.

The population, which includes Beatrice's representative, is stored in the Virtual Population site in a database. Beatrice's Virtual Representative has been loaded into memory by a transaction over a network as she came into the Site. Beatrice may have been referenced using any number of technologies including e-wallet technology, various other infomediary technologies, or a cookie recognition scheme and login procedure. Beatrice's Virtual Representative changes locally at the e-Store Site to reflect the new preference instantly, and the newly learned preference for sports clothing has also been automatically sent to the Virtual Population site. This makes it available for future visits.

All information learned, whether it is specific to a particular e-Store, a particular category of store (e.g., travel or retail), or universal information about Beatrice such as her name, is available for instant reasoning while Beatrice visits, and is made available for subsequent visits because her Virtual Representative is also updated across the network. After making her purchase, Beatrice leaves the sports section. Later, she goes back to the sports section, either on the same date after more shopping at the e-Store, or at a later date. Because she has an instantly recognized preference for sports clothing, a new offer appears to her the next time the sports section page loads. A tee shirt offer on special appears on the revisited sports section page, where there previously was no product offer at all.

This is an e-commerce example of the experience a known visitor to an enabled web site might have. Beatrice has been modeled and factual information relating to her preferences, behavior, and simple facts such as age, income and the like are stored in Beatrice's Virtual Representative in the Virtual Population site database. Rules which are specific to the virtual place e-Store and virtual consumer population were applied by a reasoning engine to Beatrice's facts comprising her Virtual Representative to produce a unique visitation experience for Beatrice. Dynamically, Beatrice's virtual representative is updated during her visit.

Beatrice's experience will differ from the experiences of other visitors, since their Virtual Representatives will contain different facts relating to their preferences, behavior and simple factual data, notwithstanding the fact that they each fit the model designed for a specific Virtual Population. The overall experience received at Beatrice's access site in the form of information, images, and sensory perception will depend on Beatrice's previous activity at the Enterprise, her current interaction with the Enterprise Expert, and the rules of engagement that the expert system is currently using.

As Beatrice uses her web browser to access the home web page of the e-Store, a plugin is activated by a call to manage real estate on the e-Store's main page. The call looks as follows:

IntelligentRealEstateManager (Main Page Real Estate Offer, Beatrice Id).

The plugin is provided as a natural extension of a web environment. For example, as a "CFX" extension in a Cold Fusion environment, or as a COM or DCOM object in Microsoft's® Active Server Pages (ASP) environment.

Because Beatrice has just arrived, the plugin makes a call over the network to the database housing Beatrice's Virtual Representative and her Virtual Representative is sent to the Enabled Site. Only Beatrice's facts relevant to the present discussion are shown below although any number of other facts may be present. The following are stored and referenced in memory as correlating to Beatrice:

| Category | Attribute | Value | Certainty |
|---|---|---|---|
| Fact | Name | Beatrice | 99% |
| Behavior | Total number of purchases | 6 | 99% |

The "name" fact is considered a "universal" fact and is available to all Enabled Sites using the consumer Virtual Population.

The "total number of purchases" fact is a custom, customer-specific fact which is available and useful only to the e-Store that Beatrice is visiting.

Not shown are information tags that indicate the status of the facts discussed above and fact category types. The status is such that this information can be used by this Site because of Beatrice's expressed control over her information (discussed below). Also not shown are other facts that are relevant to categories of e-Stores, such as facts relevant to various industries such as travel, retail, etc.

The set of rules in the rule base particular to the e-Store Beatrice is visiting includes the following rule:

If total number of purchases >3 THEN Main Page Promotion Offer Is $30 gift certificate It also contains the following rule:

If There Is A Preference For women's clothes=sports THEN Sports Page Cross Sell Offer IS Tee Shirt Offer We have seen the main page call and we have seen Beatrice's Virtual Representative. Therefore, we can now understand why Beatrice will be offered the $30 gift certificate. As the main page loads, the plugin calls the Inference Engine with Beatrice's ID, the RuleBase is applied to Beatrice, and the decision is made to make the offer because it is true that Beatrice has made more than 3 purchases.

Next, the plugin calls the Customer Real Estate Library telling it to retrieve the $30 gift certificate. The retrieved Real Estate is passed back to the main page call to the plugin, the web page finishes loading, and the $30 gift certificate is displayed.

Turning now to learning, when Beatrice makes her third sports shorts purchase a call is made to add a new fact to the FactBase comprising the Virtual Representative for Beatrice. The Web programmer has put this line of code into the shopping cart code for the e-Store. Since the total number of purchases is also a fact that is tracked, this behavior fact is also updated. The API calls to the plugin look like this:

IntelligentVRBuilder (Beatrice-Id,behavior,total number of purchases, 1)

IntelligentVRBuilder (Beatrice Id,preference,women's clothes, sports)

The relevant facts for Beatrice now look like this:

| Category | Attribute | Value | Certainty |
|---|---|---|---|
| Fact | Name | Beatrice | 99% |
| Behavior | total number of purchases | 7 | 99% |

-continued

| Category | Attribute | Value | Certainty |
|---|---|---|---|
| Preference | women's clothes | sports | 75% |

These API calls update facts that are held in Beatrice's Virtual Representative at the e-Store. The expert system installed with the plugin, which is designed specifically to understand retail selling, is aware that purchases are increasing and adds an additional purchase to the total.

By the time Beatrice leaves the shopping cart page, her Virtual Representative has already been updated at the e-Store with these two new pieces of information, and her remotely stored representative is simultaneously updated at the Virtual Population site via a call over the network. The plugin makes use of the Virtual Visitor Manager part of the expert system to achieve this. With Beatrice's profile updated dynamically, changes to it will change her visitation experience as rules are applied to facts to produce results every time a page loads.

When Beatrice goes back to the sportswear page, the rules are once again applied to the virtual Beatrice which has now been changed, the result being that a T-shirt Offer is displayed. The expert system has applied rules to the profile of Beatrice's Virtual Representative and reached a judgement or decision to make Beatrice the T-shirt offer. As before, the Customer Real Estate Library is then contacted. The T-shirt offer is then returned to the program call that exists on the sportswear section page. Previously, the following rule was not successful. Beatrice causes the sports clothing main page to load again and a call is made as follows as the page loads:

IntelligentRealEstateManager (Sports Page Cross Sell Offer, Beatrice Id).

The RuleBase applies the following rule to the FactBase:

IF There Is A Preference For women's clothes=sports THEN Sports Page Cross Sell Offer IS Tee Shirt Offer Some facts are customer specific. The "total number of purchase" fact of this example is a custom, customer specific fact. It is specific to the e-Store of this example and as such is retrieved as part of the Virtual Representative of Beatrice as she visits. On the other hand, the preference fact of this example is an example of a fact that does not happen to be a customer specific fact. When Beatrice goes shopping to another Enabled Site, this preference will enhance her shopping experience wherever it makes sense to do so (for example a sports e-Mall would likely use this information about Beatrice). But this will be possible only if Beatrice has allowed this use of her personal information as expressed through her interaction with the Visitor Tool.

Rule ordering is important. Any number of rules can be present which are relevant to the "Sports Page Cross Sell Offer" area. The first successful rule in the list of rules for this area will be the one to succeed. On the other hand, rules which are more important that others can be ordered by the marketer using this feature to optimize what is most important to sell, for example.

EXAMPLE 2

An Unknown Visitor

In this example, an unknown Visitor, Tamara, comes to the same e-Store that Beatrice is visiting. This could occur at the same time as any number of visitors can be handled, each individually.

As Tamara enters the e-Store, an attempt to load her Virtual Representative reveals that there are no relevant facts about her at all. Her Virtual Representative is empty. Tamara is an unknown visitor. Nonetheless, the following call to the API serviced by the plugin will be made:

IntelligentRealEstateManager (Main Page Real Estate Offer, Unknown1 Id)

The ID is Tamara's Id, which is "Unknown 1".

The following rule is in the RuleBase:

IF Unknown Visitor THEN Main Page Promotion Offer IS $10 gift certificate for registering In the same place where the $30 gift certificate promotion was shown to Beatrice, (the area identified in the call above as "Main Page Promotion Offer"), a $10 gift certificate offer is shown to Tamara. "$10 gift certificate for registering" is shown her in the hope that she will become a registered customer. Therefore, even when the information is that there is "no information", the system is able to exploit this dynamically.

Tamara decides to fill out the form associated with the gift certificate, resulting in a whole new list of facts becoming available for instant reasoning, which will then be used to dynamically change her visitation experience. These facts are also sent back to the Virtual Population site and are ready for Beatrice to view and change, allowing her to specify how she wants them to be used by other Sites and businesses.

In the above Examples, the following components may be used as set forth:

Marketer Toolset Component

The marketer's tools are web-based and are intended for use over the Internet. These tools allow for rule editing, content management, and access to reports. They are designed to be used by a marketing person of the enabled site. After the marketer enters her or his username and password, the main page of the Marketer Toolset appears. Each tool is described below.

Marketer Toolset Component: Rule Editor

The rule editor makes use of the fact that the semantic model is fixed. This makes it possible for the rule editor to have a "point and click" style interface. A rule is built by clicking on the relevant possible choices. For example, set clickable lists are used to create the following conjunction:

male AND age>50 AND income >$100,000

This is possible because the simple facts "gender", "age", and "income" are part of the Semantic Model. The rules that a marketer can enter are point and click, which makes the entering of rules very simple.

Similarly, what comes after the "THEN" part of a rule is also selectable from a known list because these are areas which are made available through the Content Library Manager, described below. For example:

THEN Main Page PromoArea

This may be selected from known lists of all real estate areas. A new area has to be typed in once.

What follows the "IS" part of a rule is also available as a clickable list because this is information which is readily electronically available from the Content Library, described below. This tool makes all content available to the system for automatic retrieval. For example:

IS $30 Gift Certificate

"$30 Gift Certificate" can be selected from the known list of content presented to the user a clickable form.

Any number of conjunctions, disjunctions and so on are also easily supported with the point and click interface, as are special aspects of the rule language such as "Unknown Visitor".

Marketer Toolset Component: Report Generator

The report generator exploits the wealth of information made available by the expert system that knows every rule that succeeds, every visitor it sees, any real estate it shows, and all aspects of all virtual visitors. As such a rich set of reports available by time period are available. The information used is saved in a database accessible to the system. Of particular importance is the set of data the Enterprise Expert stores, making available information for a user specified time period. Such information includes, for example, without limitation, the following:

Number of successful rules per real estate area

Number of known visitors

Number of unknown visitors

Number of visitors with any particular attribute

Number of virtual visitor updates (and for any particular attribute)

Number of preference facts added to virtual representatives (behavior, simple facts)

Real estate shown

Real estate shown to visitors with a particular specified attribute

Most successful rules

Least successful rules

Rules not used

Marketer Toolset Component: Content Library Manager

The Content Library Manager is a very simple tool that provides the system with access to customer specific content. It performs tasks including, but not limited to the following:

Allows for the addition of a real estate, which includes a label and a location

Allows for real estate update

In one aspect of the present invention, it is only necessary to store pointers to the Real Estate in the scheme above, and not to store the actual Real Estate. Any content that can be displayed on a web page can be pointed to and/or stored and used by the system.

Visitor Tool

The Visitor Tool provides web-based real world Visitor access to their corresponding Virtual Representative in the Virtual Population. A Visitor Expert conducts the edit/change session with the User. The Visitor Expert applies rules which understand the population model. For example, if a Visitor changes the number of children in the household from 2 to 3, the expert will ask if there is a newborn in the family. This expert system is desirably population specific.

Other Aspects of the System

As to the extensible semantic model, the system of the present invention desirably dissociates syntax from semantics and new attributes can be added at any time and can be understood by all the components of the system using them. For example, the various attributes if available to the point and click rule editor can be read dynamically, and a new attribute such as a preference for sports cars can be added by simply reading the appropriate list of supported attributes. A new expert system may also need to be added which has an inherent understanding of this preference. However, this too can be updated at the same time. The semantic model is simply not hard-coded.

A Population Expert, desirably specific to the population modeled, reasons about the aggregate population. This expert looks at the entire population and deduces purchasing behavior patterns, for example, in a population of modeled consumers.

The examples set forth above serve to illustrate the present invention, but in no way are intended to limit the spirit and scope thereof, which is defined by the following claims.

What is claimed is:

1. A method for determining information to be provided to a particular user of a plurality of users, comprising the steps of:
   (a) receiving initial data associated with the particular user;
   (b) providing at least one criterion based on the initial data;
   (c) determining the information to be provided to the particular user based on the at least one criterion; and
   (d) establishing a billing facility for billing a party providing a particular content based a firing of the at least one rule.

2. The method according to claim 1, further comprising the step of:
   (e) billing the party only for non-default content.

3. The method according to claim 1, wherein the billing facility is capable of billing the party based on a successful identification of the particular user.

4. A method for determining information to be provided to a particular user of a plurality of users, comprising the steps of:
   (a) receiving initial data associated with the particular user;
   (b) providing at least one criterion based on the initial data;
   (c) determining the information to be provided to the particular user based on the at least one criterion; and
   (d) providing a report generator for generating reporting data regarding at least one of:
      (i) an expert activity,
      (ii) a use of rules of the at least one criterion, and
      (iii) a success of the used rules.

5. A system for determining information to be provided to a particular user of a plurality of users, comprising:
   a processing arrangement which:
      (a) receives initial data associated with the particular user,
      (b) provides at least one criterion based on the initial data,
      (c) determines the information to be provided to the particular user based on the at least one criterion, and
      (d) establishes a billing facility for billing a party providing a particular content based a firing of the at least one rule.

6. A system for determining information to be provided to a particular user of a plurality of users, comprising:
   a processing arrangement which:
      (a) receives initial data associated with the particular user,
      (b) provides at least one criterion based on the initial data,
      (c) determines the information to be provided to the particular user based on the at least one criterion, and
      (d) provides a report generator for generating reporting data regarding at least one of:
         (i) an expert activity,
         (ii) a use of rules of the at least one criterion, and
         (iii) a success of the used rules.

* * * * *